US009658070B2

(12) United States Patent
Roumeliotis et al.

(10) Patent No.: US 9,658,070 B2
(45) Date of Patent: May 23, 2017

(54) INVERSE SLIDING-WINDOW FILTERS FOR VISION-AIDED INERTIAL NAVIGATION SYSTEMS

(71) Applicant: Regents of the University of Minnesota, Minneapolis, MN (US)

(72) Inventors: Stergios I. Roumeliotis, St Paul, MN (US); Kejian J. Wu, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 6 days.

(21) Appl. No.: 14/796,574

(22) Filed: Jul. 10, 2015

(65) Prior Publication Data
US 2016/0327395 A1    Nov. 10, 2016

Related U.S. Application Data

(60) Provisional application No. 62/023,569, filed on Jul. 11, 2014.

(51) Int. Cl.
*G01C 21/10* (2006.01)
*G01C 21/16* (2006.01)
(Continued)

(52) U.S. Cl.
CPC ......... *G01C 21/165* (2013.01); *G06K 9/4604* (2013.01); *G06T 7/20* (2013.01);
(Continued)

(58) Field of Classification Search
CPC .. G01C 21/16; G06T 7/00; G06T 7/20; G06K 9/46
(Continued)

(56) References Cited

U.S. PATENT DOCUMENTS 5,847,755 A    12/1998    Wixson et al.
7,015,831 B2   3/2006     Karlsson et al.
(Continued)

FOREIGN PATENT DOCUMENTS

WO    WO 2015013418 A2    1/2015
WO    WO 2015013534 A1    1/2015

OTHER PUBLICATIONS

Ayache et al., "Maintaining Representations of the Environment of a Mobile Robot," IEEE Transactions on Robotics and Automation, vol. 5, No. 6, Dec. 1989, pp. 804-819.
(Continued)

*Primary Examiner* — Thomas G Black
*Assistant Examiner* — Luke Huynh
(74) *Attorney, Agent, or Firm* — Shumaker & Sieffert, P.A.

(57) ABSTRACT

This disclosure describes inverse filtering and square root inverse filtering techniques for optimizing the performance of a vision-aided inertial navigation system (VINS). In one example, instead of keeping all features in the system's state vector as SLAM features, which can be inefficient when the number of features per frame is large or their track length is short, an estimator of the VINS may classify the features into either SLAM or MSCKF features. The SLAM features are used for SLAM-based state estimation, while the MSCKF features are used to further constrain the poses in the sliding window. In one example, a square root inverse sliding window filter (SQRT-ISWF) is used for state estimation.

27 Claims, 15 Drawing Sheets

(51) Int. Cl.
  *G06T 7/20* (2017.01)
  *G06K 9/46* (2006.01)
  *G06T 7/70* (2017.01)
(52) U.S. Cl.
  CPC ...... *G06T 7/70* (2017.01); *G06T 2207/30241* (2013.01); *G06T 2207/30244* (2013.01)
(58) Field of Classification Search
  USPC ............ 701/500, 501, 468, 472; 342/357.31, 342/357.34, 357.32, 357.65
  See application file for complete search history.

(56) References Cited

U.S. PATENT DOCUMENTS

| | | | |
|---|---|---|---|
| 7,162,338 B2 | 1/2007 | Goncalves et al. | |
| 7,991,576 B2 | 8/2011 | Roumeliotis | |
| 8,577,539 B1 | 11/2013 | Morrison et al. | |
| 8,996,311 B1* | 3/2015 | Morin | G01C 21/165 342/357.3 |
| 2002/0198632 A1 | 12/2002 | Breed et al. | |
| 2004/0073360 A1 | 4/2004 | Foxlin | |
| 2004/0167667 A1 | 8/2004 | Goncalves et al. | |
| 2008/0167814 A1* | 7/2008 | Samarasekera | G01C 21/005 701/469 |
| 2008/0265097 A1* | 10/2008 | Stecko | B64D 39/00 244/135 A |
| 2008/0279421 A1 | 11/2008 | Hamza et al. | |
| 2009/0248304 A1 | 10/2009 | Roumeliotis et al. | |
| 2010/0110187 A1 | 5/2010 | von Flotow et al. | |
| 2012/0194517 A1 | 8/2012 | Izadi et al. | |
| 2014/0316698 A1* | 10/2014 | Roumeliotis | G01C 21/165 701/500 |
| 2014/0333741 A1 | 11/2014 | Roumeliotis et al. | |

OTHER PUBLICATIONS

Bartoli et al., "Structure from Motion Using Lines: Representation, Triangulation and Bundle Adjustment," Computer Vision and Image Understanding, vol. 100, Aug. 11, 2005, pp. 416-441.
Bayard et al., "An Estimation Algorithm for Vision-Based Exploration of Small Bodies in Space," 2005 American Control Conference, Jun. 8-10, 2005, pp. 4589-4595.
Breckenridge, "Interoffice Memorandum to T. K. Brown, Quaternions—Proposed Standard Conventions," I0M 343-79-1199, Oct. 31, 1979, 12 pp.
Canny, "A Computational Approach to Edge Detection," IEEE Transactions on Pattern Analysis and Machine Intelligence, vol. 8, No. 6, Nov. 1986, pp. 679-698.
Chen, "Pose Determination from Line-to-Plane Correspondences: Existence Condition and Closed-Form Solutions," Proceedings on the 3$^{rd}$ International Conference on Computer Vision, Dec. 4-7, 1990, pp. 374-378.
Chiuso et al., "Structure From Motion Causally Integrated Over Time," IEEE Transactions on Pattern Analysis and Machine Intelligence, vol. 24, No. 4, Apr. 2002, pp. 523-535.
Davison et al., "Simultaneous Localisation and Map-Building Using Active Vision," Jun. 2001, 18 pp.
Deans "Maximally Informative Statistics for Localization and Mapping," Proceedings of the 2002 IEEE International Conference on Robotics & Automation, May 2002, pp. 1824-1829.
Dellaert et al., "Square Root SAM: Simultaneous Localization and Mapping via Square Root Information Smoothing," International Journal of Robotics and Research, vol. 25, No. 12, Dec. 2006, pp. 1181-1203.
Diel, "Stochastic Constraints for Vision-Aided Inertial Navigation," Massachusetts Institute of Technology, Department of Mechanical Engineering, Master Thesis, Jan. 2005, 106 pp.
Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.

Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.
Eustice et al., "Exactly Sparse Delayed-slate Filters for View-based SLAM," IEEE Transactions on Robotics, vol. 22, No. 6, Dec. 2006, pp. 1100-1114.
Eustice et al., "Visually Navigating the RMS Titanic With SLAM Information Filters," Proceedings of Robotics Science and Systems, Jun. 2005, 9 pp.
Guo et al., "IMU-RGBD Camera 3D Pose Estimation and Extrinsic Calibration: Observability Analysis and Consistency Improvement," Proceedings of the IEEE International Conference on Robotics and Automation. May 6-10, 2013, pp. 2935-2942.
Guo et al., "Observability-constrained EKF Implementation of the IMU-RGBD Camera Navigation Using Point and Plane Features," Technical Report, University of Minnesota, Mar. 2013, 6 pp.
Hermann et al., "Nonlinear Controllability and Observability," IEEE Transactions on Automatic Control, vol. 22, No. 5, Oct. 1977, pp. 728-740.
Herrera et al., "Joint Depth and Color Camera Calibration with Distortion Correction," IEEE Transactions on Pattern Analysis and Machine Intelligence, vol. 34, No. 10, Oct. 2012, pp. 2058-2064.
Hesch et al., "Observability-constrained Vision-aided Inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Huang et al., "Visual Odometry and Mapping for Autonomous Flight Using an RGB-D Camera," Proceedings of the International Symposium on Robotics Research, Aug. 28-Sep. 1, 2011, 16 pp.
Huster, "Relative Position Sensing by Fusing Monocular Vision and Inertial Rate Sensors," Stanford University, Department of Electrical Engineering, Dissertation, Jul. 2003, 158 pp.
Johannsson et al., "Temporally Scalable Visual Slam Using a Reduced Pose Graph," in Proceedings of the IEEE International Conference on Robotics and Automation, May 6-10, 2013, 8 pp.
Jones et al., "Visual-inertial Navigation, Mapping and Localization: A Scalable Real-time Causal Approach," International Journal of Robotics Research, vol. 30, No. 4, Mar. 31, 2011, pp. 407-430.
Kaess et al., "iSAM: Incremental Smoothing and Mapping," IEEE Transactions on Robotics, Manuscript, Sep. 7, 2008, 14 pp.
Kaess et al., "iSAM2: Incremental Smoothing and Mapping Using the Bayes Tree," International Journal of Robotics Research, vol. 31, No. 2, Feb. 2012, pp. 216-235.
Klein et al., "Parallel Tracking and Mapping for Small AR Workspaces," Proceedings of the IEEE and ACM International Symposium on Mixed and Augmented Reality, Nov. 13-16, 2007, pp. 225-234.
Konolige et al., "Efficient Sparse Pose Adjustment for 2D Mapping," Proceedings of the IEEE/RSJ International Conference on Intelligent Robots and Systems, Oct. 18-22, 2010, pp. 22-29.
Konolige et al., "FrameSLAM: From Bundle Adjustment to Real-Time Visual Mapping," IEEE Transactions on Robotics, vol. 24, No. 5, Oct. 2008, pp. 1066-1077.
Konolige et al., "View-based Maps," International Journal of Robotics Research, vol. 29, No. 8, Jul. 2010, pp. 941-957.
Kottas et al., "On the Consistency of Vision-aided Inertial Navigation," Proceedings of the International Symposium on Experimental Robotics, Jun. 17-20, 2012, 15 pp.
Kummerle et al., "g$^2$o: A General Framework for Graph Optimization," Proceedings of the IEEE International Conference on Robotics and Automation, May 9-13, 2011, pp. 3607-3613.
Langelaan, "State Estimation for Autonomous Flight in Cluttered Environments," Stanford University, Department of Aeronautics and Astronautics, Dissertation, Mar. 2006, 128 pp.
Liu et al., "Estimation of Rigid Body Motion Using Straight Line Correspondences," Computer Vision, Graphics, and Image Processing, vol. 43, No. 1, Jul. 1988, pp. 37-52.
Li et al., "Improving the Accuracy of EKF-based Visual-Inertial Odometry," 2012 IEEE International Conference on Robotics and Automation, May 14-18, 2012, pp. 828-835.

(56) References Cited

OTHER PUBLICATIONS

Lowe, "Distinctive Image Features From Scale-Invariant Keypoints," International Journal of Computer Vision, Jan. 5, 2004, 28 pp.

Lupton et al., "Visual-inertial-aided Navigation for High-dynamic Motion in Built Environments Without Initial Conditions," IEEE Transactions on Robotics, vol. 28, No. 1, Feb. 2012, pp. 61-76.

Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.

Matas et al., "Robust Detection of Lines Using the Progressive Probabilistic Hough Transformation," Computer Vision and Image Understanding, vol. 78, No. 1, Apr. 2000, pp. 119-137.

McLauchlan, "The Variable State Dimension Filter Applied to Surface-Based Structure From Motion CVSSP Technical Report VSSP-TR-4/99," University of Surrey, Department of Electrical Engineering, Dec. 1999, 52 pp.

Meltzer et al., "Edge Descriptors for Robust Wide-baseline Correspondence," IEEE Conference on Computer Vision and Pattern Recognition, Jun. 23-28, 2008, pp. 1-8.

Mirzaei et al., "A Kalman Filter-Based Algorithm for IMU-Camera Calibration: Observability Analysis and Performance Evaluation," IEEE Transactions on Robotics, vol. 24, No. 5, Oct. 2008, pp. 1143-1156.

Mirzaei et al., "Globally Optimal Pose Estimation from Line Correspondences," IEEE International Conference on Robotics and Automation, May 9-13, 2011, pp. 5581-5588.

Mirzaei et al., "Optimal Estimation of Vanishing Points in a Manhattan World," IEEE International Conference on Computer Vision, Nov. 6-13, 2011, pp. 2454-2461.

Montiel et al., "Unified Inverse Depth Parametrization for Monocular SLAM," Proceedings of Robotics: Science and Systems II (RSS-06), Aug. 16-19, 2006, 8 pp.

Mourikis et al., "A Multi-State Constraint Kalman Filter for Vision-aided Inertial Navigation," IEEE International Conference on Robotics and Automation, Apr. 10-14, 2007, pp. 3565-3572.

Mourikis et al., "Vision-Aided Inertial Navigation for Spacecraft Entry, Descent, and Landing," IEEE Transactions on Robotics, vol. 25, No. 2, Apr. 2009, pp. 264-280.

Mourikis et al., "On the Treatment of Relative-Pose Measurements for Mobile Robot Localization," Proceedings of the 2006 IEEE International Conference on Robotics and Automation, May 2006, pp. 2277-2284.

Nister et al., "Visual Odometry for Ground Vehicle Applications," Journal of Field Robotics, vol. 23, No. 1, Jan. 2006, 35 pp.

Oliensis, "A New Structure From Motion Ambiguity," IEEE Transactions on Pattern Analysis and Machine Intelligence, vol. 22, No. 7, Jul. 2000, 30 pp.

Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filing date and any foreign priority date of Jul. 11, 2014 so that the particular month of publication is not in issue.).

Prazenica et al., "Vision-Based Kalman Filtering for Aircraft State Estimation and Structure From Motion," AIAA Guidance, Navigation, and Control Conference and Exhibit, Aug. 15-18, 2005, 13 pp.

Roumeliotis et al., "Stochastic Cloning: A Generalized Framework for Processing Relative State Measurements," Proceedings of the 2012 IEEE International Conference on Robotics and Automation, May 11-15, 2002, pp. 1788-1795.

Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date and any foreign priority date of Jul. 11, 2014 so that the particular month of publication is not in issue.).

Schmid et al., "Automatic Line Matching Across Views," Proceedings of the IEEE Computer Science Conference on Computer Vision and Pattern Recognition, Jun. 17-19, 1997, pp. 666-671.

Servant et al., "Improving Monocular Plane-based SLAM with Inertial Measurements," 2010 IEEE/RSJ International Conference on Intelligent Robots and Systems, Oct. 18-22, 2010, pp. 3810-3815.

Sibley et al., "Sliding Window Filter with Application to Planetary Landing," Journal of Field Robotics, vol. 27, No. 5, Sep./Oct. 2010, pp. 587-608.

Smith et al., "On the Representation and Estimation of Spatial Uncertainty," International Journal of Robotics Research, vol. 5, No. 4, 1986, pp. 56-68 (Applicant points out that, in accordance with MPEP 609.04(a), the 1986 year of publication is sufficiently earlier than the effective U.S. filing date and any foreign priority date of Jul. 11, 2014 so that the particular month of publication is not in issue.).

Smith et al., "Real-time Monocular Slam with Straight Lines," British Machine Vision Conference, vol. 1, Sep. 2006, pp. 17-26.

Soatto et al., "Motion Estimation via Dynamic Vision," IEEE Transactions on Automatic Control, vol. 41, No. 3, Mar. 1996, pp. 393-413.

Soatto et al., "Recursive 3-D Visual Motion Estimation Using Subspace Constraints," International Journal of Computer Vision, vol. 22, No. 3, Mar. 1997, pp. 235-259.

Spetsakis et al., "Structure from Motion Using Line Correspondences," International Journal of Computer Vision, vol. 4, No. 3), Jun. 1990, pp. 171-183.

Strelow, "Motion Estimation From Image and Inertial Measurements," Carnegie Mellon University, School of Computer Science, Dissertation, CMU-CS-04-178, Nov. 2004, 164 pp.

Taylor et al., "Structure and Motion from Line Segments in Multiple Images," IEEE Transactions on Pattern Analysis and Machine Intelligence, vol. 17, No. 11, Nov. 1995, pp. 1021-1032.

Trawny et al., "Indirect Kalman Filter for 3D Attitude Estimation," University of Minnesota, Department of Computer Science & Engineering, MARS Lab, Mar. 2005, 25 pp.

Triggs et al., "Bundle Adjustment—A Modern Synthesis," Vision Algorithms: Theory & Practice, LNCS 1883, Apr. 12, 2002, 71 pp.

Weiss et al., "Real-time Metric State Estimation for Modular Vision-inertial Systems," 2011 IEEE International Conference on Robotics and Automation, May 9-13, 2011, pp. 4531-4537.

Weiss et al., "Real-time Onboard Visual-Inertial State Estimation and Self-Calibration of MAVs in Unknown Environments," 2012 IEEE International Conference on Robotics and Automation, May 14-18, 2012, pp. 957-964.

Weiss et al., "Versatile Distributed Pose Estimation and sensor Self-Calibration for an Autonomous MAV," 2012 IEEE International Conference on Robotics and Automations, May 14-18, 2012, pp. 31-38.

Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.

Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.

Zhou et al., "Determining 3-D Relative Transformations for Any Combination of Range and Bearing Measurements," IEEE Transactions on Robotics, vol. 29, No. 2, Apr. 2013, pp. 458-474.

Horn et al., "Closed-form solution of absolute orientation using orthonormal matrices," Journal of the Optical Society of America A, vol. 5, No. 7, Jul. 1988, pp. 1127-1135.

Kottas et al., "Efficient and Consistent Vision-aided Inertial Navigation using Line Observations," Department of Computer Science & Engineering, University of Minnesota, MARS Lab, TR-2012-002, Sep. 2012, 14 pp.

Bierman, "Factorization Methods for Discrete Sequential Estimation," Mathematics in Science and Engineering, Academic Press, vol. 128, 1977, 259 pp.

(56) References Cited

OTHER PUBLICATIONS

Lucas et al., "An iterative image registration technique with an application to stereo vision," Proceedings of $7^{th}$ the International Joint Conference on Artificial Intelligence, Aug. 24-28, 1981, pp. 674-679.
Kneip et al., "Robust Real-Time Visual Odometry with a Single Camera and an IMU," Proceedings of the British Machine Vision Conference, Aug. 29-Sep. 2, 2011, pp. 16.1-16.11.
Chiu et al., "Robust vision-aided navigation using sliding-window factor graphs," 2013 IEEE International Conference on Robotics and Automation, May 6-10, 2013, pp. 46-53.
Kottas et al., "An iterative Kalman smoother for robust 3D localization on mobile and wearable devices," Proceedings of the IEEE International Conference on Robotics and Automation, May 26-30, 2015, pp. 6336-6343.
Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.
Li et al., "Vision-aided inertial navigation with rolling-shutter cameras," The International Journal of Robotics Research, retrieved from ijr.sagepub.com on May 22, 2015, 18 pp.
Ait-Aider et al., "Simultaneous object pose and velocity computation using a single view from a rolling shutter camera," Proceedings of the IEEE European Conference on Computer Vision, May 7-13, 2006, pp. 56-68.
Baker et al., "Removing rolling shutter wobble," Proceedings of the IEEE Conference on Computer Vision and Pattern Recognition, Jun. 13-18, 2010, pp. 2392-2399.
Boyd et al., "Convex Optimization," Cambridge University Press, 2004, 730 pp. (Applicant points out that, in accordance with MPEP 609.04(a), the 2004 year of publication is sufficiently earlier than the effective U.S. filing date and any foreign priority date of Jul. 11, 2014 so that the particular month of publication is not in issue.).
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filing date and any foreign priority date of Jul. 11, 2014 so that the particular month of publication is not in issue.).
Guo et al., "IMU-RGBD camera 3D pose estimation and extrinsic calibration: Observability analysis and consistency improvement," Proceedings of the IEEE International Conference on Robotics and Automation, May 6-10, 2013, pp. 2920-2927.
Harris et al., "A combined corner and edge detector," Proceedings of the Alvey Vision Conference, Aug. 31-Sep. 2, 1988, pp. 147-151.
Hesch et al., "Consistency analysis and improvement of vision-aided inertial navigation," IEEE Transactions on Robotics, vol. 30, No. 1, Feb. 2014, pp. 158-176.
Huang et al., "Observability-based rules for designing consistent EKF slam estimators," International Journal of Robotics Research, vol. 29, No. 5, Apr. 2010, pp. 502-528.
Jia et al., "Probabilistic 3-D motion estimation for rolling shutter video rectification from visual and inertial measurements," Proceedings of the IEEE International Workshop on Multimedia Signal Processing, Sep. 2012, pp. 203-208.
Kelly et al., "A general framework for temporal calibration of multiple proprioceptive and exteroceptive sensors," Proceedings of International Symposium on Experimental Robotics, Dec. 18-21, 2010, 15 pp.
Kelly et al., "Visual-inertial sensor fusion: Localization, mapping and sensor-to-sensor self-calibration," International Journal of Robotics Research, vol. 30, No. 1, Jan. 2011, pp. 56-79.
Li et al., "3-D motion estimation and online temporal calibration for camera-IMU systems," Proceedings of the IEEE International Conference on Robotics and Automation, May 6-10, 2013, pp. 5709-5716.
Liu et al., "Multi-aided inertial navigation for ground vehicles in outdoor uneven environments," Proceedings of the IEEE International Conference on Robotics and Automation, Apr. 18-22, 2005, pp. 4703-4708.
Oth et al., "Rolling shutter camera calibration," Proceedings of the IEEE Conference on Computer Vision and Pattern Recognition, Jun. 23-28, 2013, pp. 1360-1367.
Shoemake et al., "Animating rotation with quaternion curves," ACM SIGGRAPH Computer Graphics, vol. 19, No. 3, Jul. 22-26, 1985, pp. 245-254.
Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.
Garcia et al., "Augmented State Kalman Filtering for AUV Navigation." Proceedings of the 2002 IEEE International Conference on Robotics & Automation, May 2002, 6 pp.
Bouguet, "Camera Calibration Toolbox for Matlab," retrieved from http://www.vision.caltech.edu/bouguetj/calib_doc/., Oct. 14, 2015, 5 pp.
Dong-Si et al., "Motion Tracking with Fixed-lag Smoothing: Algorithm and Consistency Analysis," Proceedings of the IEEE International Conference on Robotics and Automation, May 9-13, 2011, 8 pp.
Golub et al., "Matrix Computations, Fourth Edition," The Johns Hopkins University Press, 2013, 780 pp.
Leutenegger et al., "Keyframe-based visual-inertial odometry using nonlinear optimization," The International Journal of Robotics Research, vol. 34, No. 3, Mar. 2015, pp. 314-334.
Li et al., "Optimization-Based Estimator Design for Vision-Aided Inertial Navigation," Proceedings of the Robotics: Science and Systems Conference, Jul. 9-13, 2012, 8 pp.
Mourikis et al., "A Dual-Layer Estimator Architecture for Long-term Localization," Proceedings of the Workshop on Visual Localization for Mobile Platforms, Jun. 24-26, 2008, 8 pp.
Nerurkar et al., "C-KLAM: Constrained Keyframe-Based Localization and Mapping," Proceedings of the IEEE International Conference on Robotics and Automation, May 31-Jun. 7, 2014, 6 pp.
"Project Tango," retrieved from https://www.google.com/atap/projecttango on Nov. 2, 2015, 4 pp.
Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.
U.S. Appl. No. 14/768,733, by Stergios I. Roumeliotis et al., filed Feb. 21, 2014.
U.S. Appl. No. 14/733,468, by Stergios I. Roumeliotis et al., filed Jun. 8, 2015.

\* cited by examiner

FIG. 6

INVERSE SLIDING-WINDOW FILTERS FOR VISION-AIDED INERTIAL NAVIGATION SYSTEMS

This application claims the benefit of U.S. Provisional Patent Application No. 62/023,569, filed Jul. 11, 2014, the entire contents of which are incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity to address GPS-denied navigation.

SUMMARY

In general, this disclosure describes techniques for enhanced inverse sliding-window filter (ISWF) for estimation within vision-aided inertial navigation systems (VINS).

In one example, a vision-aided inertial navigation system comprises at least one image source to produce image data along a trajectory of the VINS within an environment, wherein the image data contains a plurality of features observed within the environment at a plurality of poses of the VINS along the trajectory, and an inertial measurement unit (IMU) to produce IMU data indicative of motion of the vision-aided inertial navigation system. The VINS includes a hardware-based a processing unit executing an estimator that determines, based on the image data and the IMU data, estimates for at least a position and orientation of the vision-aided inertial navigation system for a plurality of poses of the VINS along the trajectory. The estimator computes the estimates by: classifying, for each of the poses, each of the features observed at the respective pose into either a first set of the features or a second set of the features, maintaining a state vector having estimated states for a position and orientation of the VINS and for positions within the environment for the first set of features for a sliding window of two or more of the most recent poses along the trajectory without maintaining states for positions of the second set of features within the state vector, and applying an inverse sliding window filter to compute constraints between poses within the sliding window based on the second set of features and compute, in accordance with the constraints, the state estimates within the state vector for the sliding window. The estimator applies the inverse sliding window filter by, for each update of the state estimates within the state vector, computing a Hessian matrix that excludes at least a portion of the second features set, wherein the Hessian matrix represents a subset of the IMU data and the image along the trajectory.

In another example, a method comprises producing image data along a trajectory of the vision-aided inertial navigation system (VINS) within an environment, wherein the image data contains a plurality of features observed within the environment at a plurality of poses of the VINS along the trajectory, and producing inertial measurement data from an inertial measurement unit (IMU) indicative of motion of the vision-aided inertial navigation system. The method further comprises determining estimates for a position and orientation of the vision-aided inertial navigation system for a plurality of poses of the VINS along the trajectory, based on the image data and the IMU data, with a processing unit comprising an estimator. Determining the estimates comprises classifying, for each of the poses, each of the features observed at the respective pose into either a first set of the features or a second set of the features, maintaining a state vector having states for the position and orientation of the VINS and for positions with the environment for the first set of features for a sliding window of two or more of the most recent poses along the trajectory without maintaining states for positions of the second set of features, and applying an inverse sliding window filter to compute constraints between poses within the sliding window based on the second set of features and compute, in accordance with the constraints, the state estimates within the state vector for the sliding window. In one example, applying an inverse sliding window filter comprises computing a Hessian matrix that excludes the second features set, wherein the Hessian matrix represents a subset of the IMU data and the image along the trajectory based on a budget computed by the VINS and computing the state estimates based on the Hessian.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 illustrates the Hessian augmented with the new robot pose.

DETAILED DESCRIPTION

Figure 1:
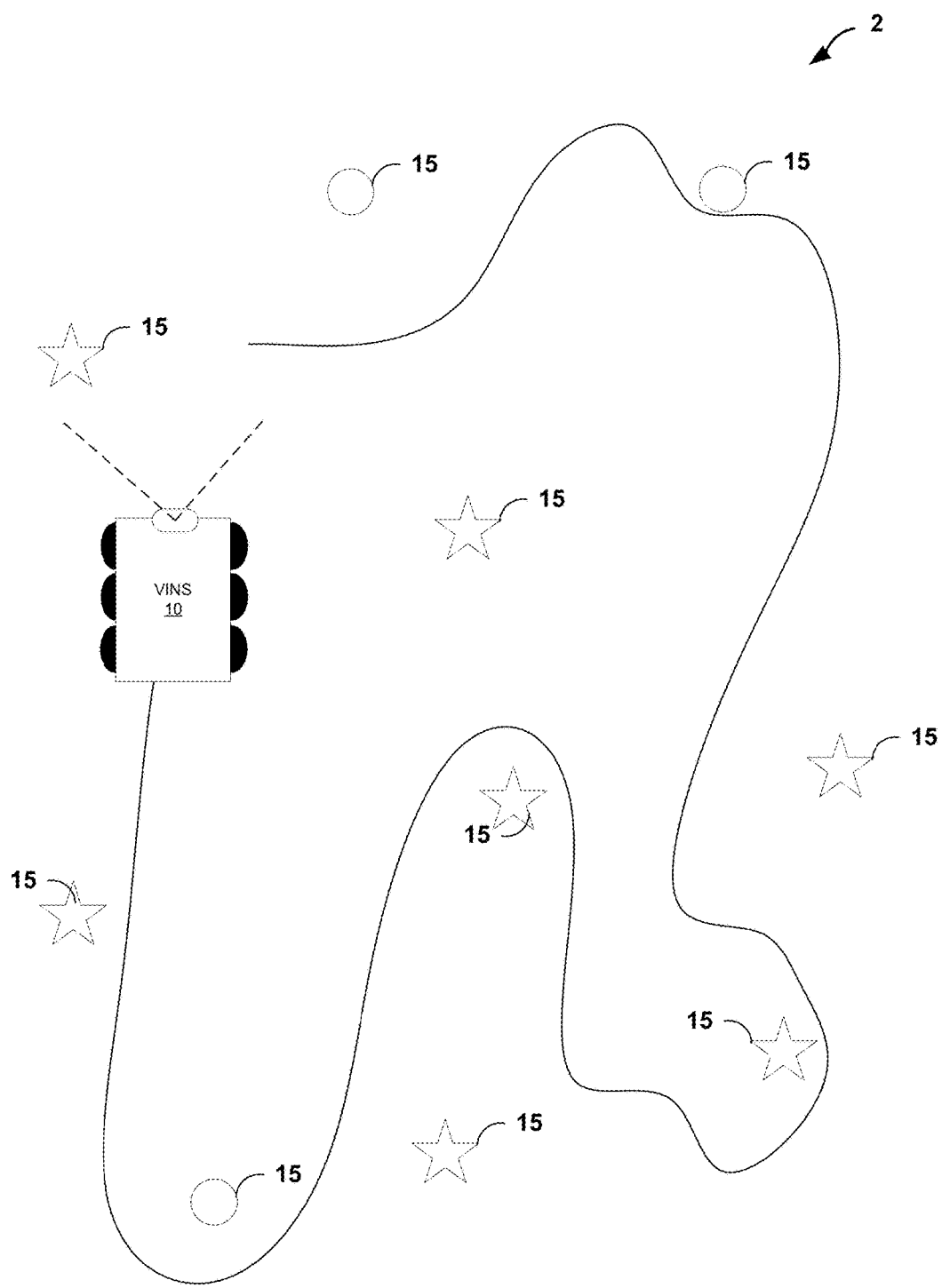
FIG. 1 is a schematic diagram illustrating an example vision-aided inertial navigation system (VINS) 10 performing simultaneous localization and mapping (SLAM) in an example environment according to the techniques described herein.

FIG. 1 is a block diagram illustrating a vision-aided inertial navigation system (VINS) 10 that navigates an environment 2 having a plurality of features 15 using one or more image sources and inertial measurement unit (IMUs). That is, as described herein, VINS 10 may perform simultaneous localization and mapping (SLAM) by constructing a map of environment 2 while simultaneously determining the position and orientation of VINS 10 as the VINS traverses the environment. In other example implementations, VINS 10 performs localization by determining its position and orientation within the environment without constructing a map of the environment. Environment 2 may, for example, represent an environment where conventional GPS-signals are unavailable for navigation, such as on the moon or a different planet or even underwater. As additional examples, environment 2 may represent an indoors environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2. VINS 10 represents any mobile device that implements the techniques described herein. VINS 10 may be, for example, a robot, mobile sensing platform, a mobile phone, a laptop, a tablet computer, a vehicle, and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

As shown in FIG. 1, VINS 10 traverses environment 2 along a trajectory. In general, VINS 10 may traverse environment 2 while performing localization of VINS 10 within the environment with or without constructing a map of portions or all of the environment. In other examples, VINS 10 may navigate environment 2 using existing mapping information so to achieve one or more desired destinations. For purposes of example, VINS 10 is shown as an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10. As described in detail herein, VINS 10 includes a hardware-based computing platform that implements an estimator that fuses the image data and the IMU data to perform localization of VINS 10 within environment 10. That is, based on the image data and the IMU data, VINS 10 determines, at discrete points along the trajectory of VINS as the VINS traverses environment 2, poses (position and orientation) of VINS 10 as well as positions of features 15. Utilizing these techniques, VINS 10 may navigate environment 2 and, in some cases, may construct a map of the environment including the positions of features 15.

As described herein, in one example implementation, VINS 10 implements an inverse, sliding-window filter (ISWF) for processing inertial and visual measurements. That is, estimator 22 applies the ISWF to process image data 14 and IMU data 18 to estimate the 3D IMU pose and velocity together with the time-varying IMU biases and to produce, based on the captured image data, estimates for poses of VINS 10 along the trajectory and an overall map of visual features 15. In one example, the inverse sliding-window filter of the estimator comprises a square root inverse sliding window filter (SQRT ISWF). In this way, as further explained herein, estimator 22 recursively operates on a sliding window of estimates for the poses of VINS 10 and positions of features 15 and utilizes an inverse to compute constraints between poses within the sliding window based certain observed features to compute, in accordance with the constraints, state estimates for the sliding window.

Figure 2:
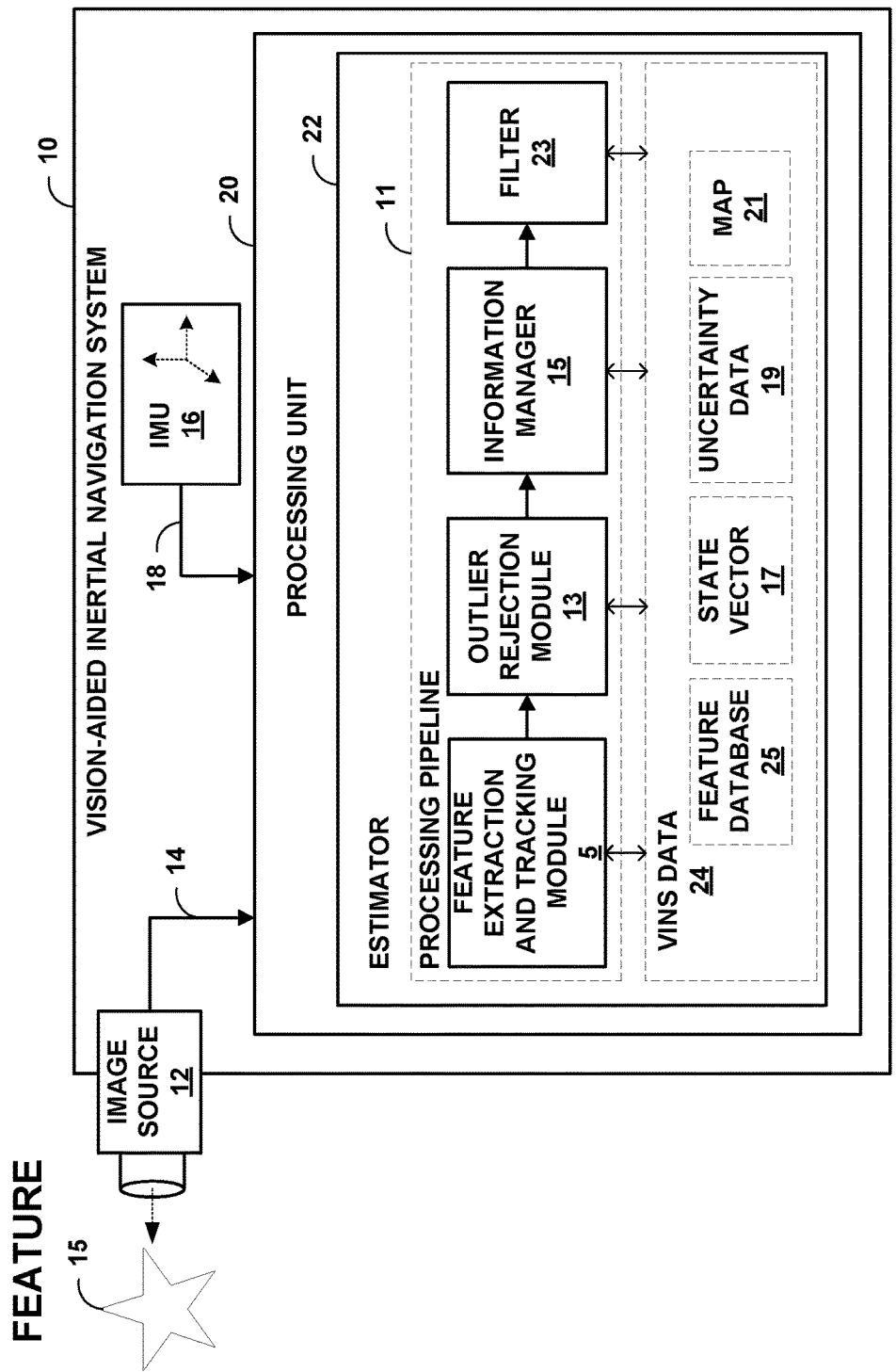
FIG. 2 is a block diagram illustrating a sensor platform comprising an IMU and a camera.

FIG. 2 illustrates an example implementation of VINS 10 in further detail. Image source 12 of VINS 10 images an environment in which VINS 10 operates so as to produce image data 14. That is, image source 12 generates image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system having multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance one or more clocks associated with the image source. In other words, image source 12 may produce image data 14 at each of a first set of time instances along a trajectory within the three-dimensional (3D) environment, wherein the image data captures features 15 within the 3D environment at each of the first time instances.

IMU 16 produces IMU data 18 indicative of a dynamic motion of VINS 10. IMU 16 may, for example, detect a current rate of acceleration using one or more accelerometers as VINS 10 is translated, and detect the rate rotational velocity (i.e., the rate of change in rotational attributes like pitch, roll and yaw) using one or more gyroscopes as VINS 10 is rotated. IMU 16 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU 16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment by applying the techniques described in U.S. patent Ser. No. 14/733,468, entitled "EFFICIENT VISION-AIDED INERTIAL NAVIGATION USING A ROLLING-SHUTTER CAMERA WITH INACCURATE TIMESTAMPS," incorporated herein by reference.

In general, estimator 22 fuses image data 14 and IMU data 18 to determine a position and orientation of VINS 10 as well as positions of features 15 as the VINS traverses environment 2. That is, estimator 22 of processing unit 20 process image data 14 and IMU data 18 to compute state estimates for the various degrees of freedom of VINS 10 and, from the state estimates, computes position, orientation, speed, locations of observable features, a localized map, an odometry or other higher order derivative information represented by VINS data 24. Processing unit may, for example, comprise a hardware-based computing platform having one or more processors that execute instructions for implementing the techniques described herein.

As shown in the example of FIG. 2, estimator 22 comprises a processing pipeline 11 for measurements from image source 12 and IMU 16. In this example, processing pipeline 11 includes feature extraction and tracking module 5, outlier rejection module 13, information manager 15 and filter 23.

Feature extraction and tracking module 5 extracts features 15 from image data 14 acquired by image source 12 and stores information describing the features in feature database 25. Feature extraction and tracking module 5 may, for example, perform corner and edge detection to identify features and track features 15 across images using, for example, the Kanade-Lucas-Tomasi (KLT) techniques described in Bruce D. Lucas and Takeo Kanade, *An iterative image registration technique with an application to stereo vision*, In Proc. of the International Joint Conference on Artificial Intelligence, pages 674-679, Vancouver, British Columbia, Aug. 24-28 1981, the entire content of which in incorporated herein by reference.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique described in Laurent Kneip, Margarita Chli, and Roland Siegwart, *Robust Real-Time Visual Odometty with a Single Camera and an Imu*, In Proc. of the British Machine Vision Conference, pages 16.1-16.11, Dundee, Scotland, Aug. 29-Sep. 2 2011, the entire content of which in incorporated herein by reference.

Information manager 15 selects features from feature database 15 and feeds measurements for the selected features to filer 23, which performs simultaneous localization of the position and orientation for VINS 10 and as mapping environment 2 by iteratively optimizing over measurements for the entire trajectory is computationally extensive. As described herein, estimator 22 implements filter 23 that iteratively updates predicted state estimates over a bounded-size sliding window of state estimates for poses of VINS 10 and positions of features 15 in real-time as new image data 14 and IMU data 18 is obtained. That is, by implementing the filtering approach, estimator 22 of VINS 10 marginalizes out past state estimates and measurements through the sliding window as VINS 10 traverses environment 2 for simultaneous localization and mapping (SLAM).

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of covariance matrices for an extended Kalman filter (EKF) or a Hessian matrix for an inverse sliding-window filter described herein. That is, estimator 22 may implement filter 23 such that uncertainty data 19 takes the form of a matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19. In this example, estimator 22 operates in real-time using the present input measurements of image data 14 and IMU data 18 and the previously calculated state estimates and its uncertainty matrix. In general, when new image data 14 or IMU data 18 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only keyframes (key robot/device poses) and key landmarks while also exploiting information (e.g., visual observations and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position and orientation constraints between the preceding keyframe and the non-keyframe. Further examples of such implementations are described in U.S. patent application Ser. No. 14/271,971, entitled "CONSTRAINED KEY FRAME LOCALIZATION AND MAPPING FOR VISION-AIDED INERTIAL NAVIGATION," filed May 7, 2014, the entire contents of which are incorporated herein by reference.

As described herein, rather than apply a conventional extended Kalman filter (EKF), filter 23 of estimator 22 comprises an inverse, sliding-window filter (ISWF) or a square root, inverse, sliding window filter (SQRT ISWF) for processing inertial and visual measurements to compute, based on the image data and the IMU data, state estimates for at least a position and orientation of VINS 10 for a plurality of poses of the VINS along the trajectory. That is, estimator 22 applies the ISWF to process image data 14 and IMU data 18 to update within state vector 17 estimates for the 3D IMU pose and velocity together with the time-varying IMU biases and to produce a map 21 of visual features 15. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, VINS 10 provides two sources of information: motion information (IMU data 18) from an IMU 16, and image data 14 (e.g., feature observations) from image source 12. Estimator 22 may classify the features observations into two main categories: simultaneous localization and mapping (SLAM) features for which estimates are included and updated within a complex system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window. They require less computations than SLAM features since their feature states are not directly estimated. Further example details of an estimator that computes constraints for features 15 observed from multiple poses and utilizes constraints to compute the state estimates for VINS 10 while excluding the MSCKF features from the state vector are described in U.S. patent application Ser. No. 12/383,371, entitled "VISION-AIDED INERTIAL NAVIGATION," the entire contents of which are incorporated herein by reference.

As described herein, in one example implementation, estimator 22 bounds the number of SLAM features to facilitate real-time operation, and old features are marginalized when new SLAM features appear. The MSCKF features not included in state vector 17 are further classified into four groups, depending on the length of the feature:

Long Feature (LF): $1 \rightarrow M$
Old-Short-Features (OSF): $1 \rightarrow j$, $3 \leq j < M$
New-Short-Features (NSF): $j \rightarrow l$, $1 < j < l < M, l-j > 3$
Hope Features (HF): $j \rightarrow M$, $1 < j$ where M is the size of the sliding window of states maintained within the state vector by estimator 22. This classification scheme among MSCKF features may be helpful in determining the quality of each feature. In general, the longer a feature lasts, the more information it contains regarding localizing the poses of VINS 10.

As further described herein, in one example estimator 22 recursively updates the state estimates with state vector 17 by: classifying, for each of the poses estimated for VINS 10 along the trajectory, each of the features 15 observed at the respective pose into either a first set of the features or a second set of the features, maintaining a state vector of having predicted states for a position and orientation of the VINS and for positions with the environment for the first set of features for a sliding window of two or more of the most recent poses along the trajectory without maintaining predicted state estimates for positions of the second set of features within state vector 17, and applying a sliding window filter that utilizes an inverse to compute constraints between consecutive ones of the poses within the sliding window based on the second set of features and compute, in accordance with the constraints, updates for the predicted state estimates within the state vector for the sliding window.

In one example, estimator 22 applies the inverse sliding window filter by, for each update of the state estimates, computing a Hessian matrix that excludes at least the second features set, wherein the Hessian matrix contains information associated with only a subset of the IMU data and the image data along the trajectory based on a budget computed by the VINS, and computing the state estimates based on the Hessian.

Estimator 22 may apply the inverse sliding window filter by computing, as a covariance, only a subset of the inverse of the Hessian matrix, wherein the covariance represents the amount of uncertainty in the state estimates; identifying information sources within the estimator based on the covariance, wherein the information sources comprise VINS poses and features; and marginalizing, based on the identified information sources, a portion of the states to keep a constant-sized state vector comprising the identified VINS poses and features. In some examples, as further described below, the inverse sliding window filter comprises a square root inverse sliding window filter in which the estimator computes and maintains a square root factor of the Hessian matrix rather than maintaining the Hessian matrix itself.

In one example implementation, as described herein, estimator 22 may apply a form of visual measurement selection, also referred to herein as calculating a "budget," when performing feature selection and state estimation. When the processing resources are limited, estimator 22 may select which subset of all the available feature measurements to process, in order to achieve optimal localization accuracy. Complexity analysis may be used to estimate how much it costs to process a feature of a particular length, hence can direct the measurement selection within the "budget." For example, instead of maintaining estimates for all features 15 within the internal state vector of estimate 22 as SLAM features, which can be inefficient when the number of features per frame is large or when the track length for a given feature is short, estimator 22 may classify the features into either SLAM or MSCKF features. The SLAM features are used for SLAM-based state estimation, while the MSCKF features are used to further constrain the poses in the sliding window, such as by using a left null space (LNS) technique.

Efficient methods are described herein for MSCKF feature processing, e.g., Hessian construction and outlier rejection. Hence, the ISWF techniques described herein are able to use information from many feature measurements, resulting in more accurate state estimates. As described herein, estimator 22 may use an efficient covariance recovery method for finding the necessary covariances from the Hessian matrix. Hence, Mahalanobis distance tests can be performed to reject outlier feature measurements, resulting in a more robust localization and mapping system.

Furthermore, in one example, when computing updated predicted state estimates with state vector 17, estimator 22 may prevent projection of the image data and IMU data along at least one unobservable degree of freedom, referred to herein as Observability-Constrained Extended Kalman filter (OC-EKF). That is, responsive to receipt of new measurements, estimator 22 may suppress update of state estimates associated with one or more unobservable degrees of freedom. As one example, responsive to image data associated with a particular feature 15, estimator 22 may determine that a rotation of VINS 10 around a gravity vector may be undetectable from the input when rotation of the particular feature is coincident with the rotation of the sensing system. Similarly, translation of the sensing system may be undetectable when observed features are identically translated. By preventing projection of image data 14 and IMU data 18 along at least one unobservable degree of freedom, the techniques may improve consistency and reduce estimation errors as compared to conventional VINS. Example details of an estimator 22 for a vision-aided inertial navigation system (VINS) in which the estimator enforces the unobservable directions of the system, hence preventing spurious information gain and reducing inconsistency, can be found in U.S. patent application Ser. No. 14/186,597, entitled "OBSERVABILITY-CONSTRAINED VISION-AIDED INERTIAL NAVIGATION," filed Feb. 21, 2014, and U.S. Provisional Patent Application Ser. No. 61/767, 701, filed Feb. 21, 2013, the entire content of each being incorporated herein by reference.

Detailed computational complexity analysis for each step of the ISWF techniques is now described. Selection, information manager 15 by estimator 22, of feature measurements to be processed may be enhanced in order to achieve optimal estimation accuracy when the processing resource is limited.

The following variable definitions are used throughout this disclosure, where simply for purposes of example the term "robot pose" is used; the VINS may be any other device described herein:

$x_{R_k}$: State vector of the robot pose at time step k. Each robot pose consists of two parts: $x_{R_k} = [x_{C_k}^T, x_{M_k}^T]$
$x_{C_k}$: States in robot pose $x_{R_k}$ cloned/kept in MSCKF/ISWF.
$x_{M_k}$: States in robot pose $x_{R_k}$ dropped/marginalized in MSCKF/ISWF.
$l_j$: State vector of the SLAM feature with index j. l denotes the set of all current SLAM feature states.
$f_j$: State vector of the MSCKF feature with index j. f denotes the set of all current MSCKF feature states.
M: Number of robot poses kept in the window.
N: Number of MSCKF features observed from all robot poses in the current window.
N'L Number of SLAM features observed from all robot poses in the current window.
α: Size of the vector $x_{C_k}$.
β: Size of the vector $x_{R_k}$.
$ρ_j$: Length of the feature j, i.e., the number of poses in the current window that observe this feature j.

ISWF: Algorithm and Complexity Analysis

The following provides an overview of example implementations of filter 23 as an ISWF. The same following process may be are repeated by filter 23 of estimator 22 for each time step k:

Example ISWF:
1. Receive measurements for a new pose for VINS 10
2. Compute "budget" specifying an amount of resources that can be allocated to state estimations for the new pose of the VINS
3. Recover covariance
4. For each new measurement to SLAM features:
    (a) Perform SLAM Mahalanobis distance test
5. For each new SLAM feature:
    (a) Triangulate feature
6. For each MSCKF feature:
    (a) Triangulate feature
    (b) Perform MSCKF Mahalanobis distance test
7. Construct the Hessian matrix and residual vector corresponding to all current information
8. Compute solution for the normal equation
9. Marginalization:
    (a) Marginalize the oldest pose $x_{C_{k-M+1}}$
    (b) Marginalize the disappearing SLAM features $l_D$
    (c) Marginalize the state $x_{M_{k-1}}$ from the robot pose $x_{R_{k-1}}$ Note that, in this ISWF process, step 7 and 8 can be repeated multiple times for each time step, which eventually gives the Gauss-Newton algorithm for solving this nonlinear least-squares problem. In the sections below, the techniques are described in detail, as well as the complexity analysis.

ISWF: Hessian Construction

Figure 3:
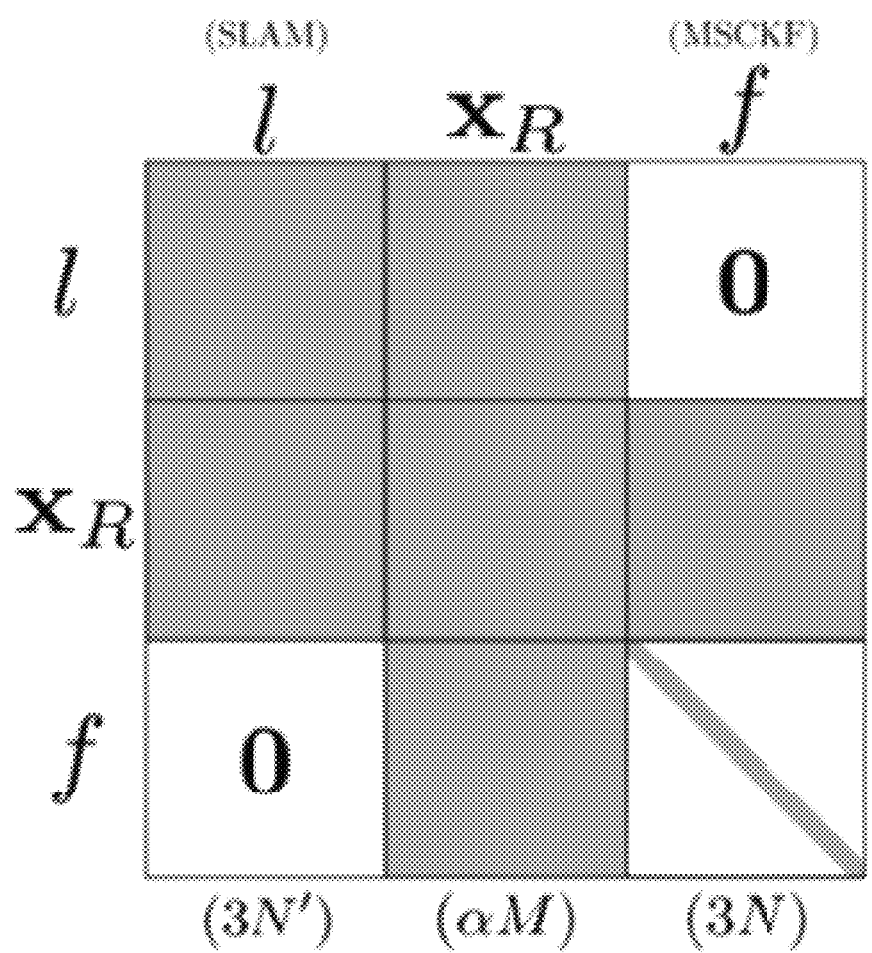
FIG. 3 illustrates the structure of the Hessian including the MSCKF feature states.

FIG. 3 illustrates an example structure of the Hessian matrix including the MSCKF feature states as maintained by estimator 22. The shaded areas indicate nonzero blocks. The diagonal block corresponding to the MSCKF feature states is block-diagonal. The size of each block is shown at the bottom.

Construction of the example Hessian matrix and the corresponding residue vector may serve as a fundamental step in the ISWF framework. The accuracy and efficiency of this procedure may, in some examples, affect the performance of the technique. Compared to the Hessian construction, the residue vector can be obtained with much less computational effort. The following sections describe example techniques for constructing the Hessian matrix.

In one example, the Hessian matrix is formed by adding together block terms corresponding to all the information sources: the prior term from previous marginalization, the proprioceptive measurement terms (e.g., motion information from an IMU), and the exteroceptive measurement terms (e.g., feature observations from a camera).

Furthermore, in this example, the feature measurements are classified into SLAM and MSCKF types. A straightforward construction, by considering as states the robot poses, SLAM feature positions, and also MSCKF feature positions, leads to the Hessian structure in FIG. 3. Note the special structure of this Hessian: the blocks corresponding to the robot poses $x_R$ and the SLAM feature states l are fully dense due to previous marginalization, while the blocks involving MSCKF feature states f have some sparse structures.

This construction, however, can be further enhanced. First, as in the case of the MSCKF, there is no need to include all of the MSCKF features into the state vector, resulting in a larger state and Hessian matrix. Second, this Hessian is a mixture of fully dense blocks and sparse blocks that have some certain structure, which is difficult to maintain and to operate on efficiently.

One approach would be to marginalize the MSCKF feature states after this first construction, by applying the Schur complement on this Hessian. However, estimator 22 may, in some examples, apply an even more efficient solution. That is, inclusion of the MSCKF features may be excluded from both the state vector and the Hessian. This may be accomplished by using a modified measurement model for the MSCKF feature measurements after the left null space technique. In particular, for MSCKF feature j, we use the Jacobian $H_R^{'j}$ to construct the Hessian, instead of $H_R^j$ and $H_f^j$. More importantly, the Jacobians $H_R^{'j}$ are already computed earlier when the MSCKF Mahalanobis distance test is performed, which may result in significant savings in terms of computations. Hence, filter 23 can directly construct the Hessian using these available Jacobians. See below for the proof of the equivalence between the naive solution and the described solution.

Figure 4:
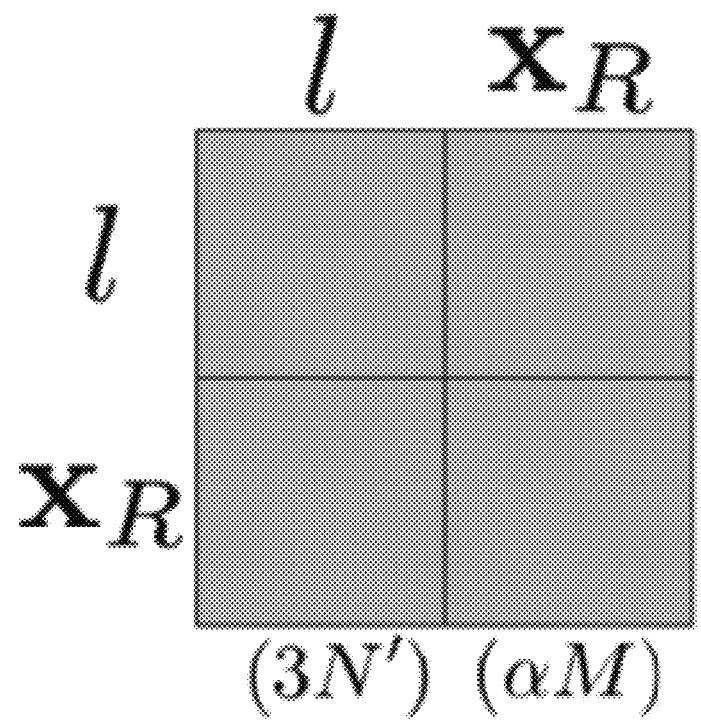
FIG. 4 illustrates the Hessian without the MSCKF feature states.

FIG. 4 illustrates the Hessian that excludes the MSCKF feature states. Note that this Hessian matrix is fully dense due to marginalization, and only involves the robot poses and the SLAM feature states in the state vector.

Next, the complexity of the Hessian construction, corresponding to each information source, is described. The prior information corresponds to a single matrix, which is already computed from previous marginalization steps. Adding the motion information has a linear cost in the number of robot poses, M, and adding the SLAM measurement information costs linear in the number of total SLAM measurements.

Indeed, the most expensive part comes from the construction of the MSCKF measurement information:

$$A_\oplus = A_\ominus + \sum_{j=1}^{N} H_R'^{jT} R^{-1} H_R'^j \quad (1)$$

$$= A_\oplus + H_R'^{jT} R^{-1} H_R' \quad (2)$$

where A is the Hessian matrix. Since the size of $H'_R$ is 2

$$\sum_{j=1}^{N} \varrho_j \times \alpha M,$$

the complexity of this multiplication is $$O\left(\alpha^2 M^2 \sum_{j=1}^{N} \varrho_j\right).$$

However, further acceleration can be achieved by applying measurement compression QR on $H'_R$. Assume that $R=\sigma^2 I$, then we have:

$$A_\oplus = A_\ominus + \frac{1}{\sigma^2} H_R'^T H_R' \quad (3)$$

$$= A_\ominus + \frac{1}{\sigma^2} R_H'^T R_H' \quad (4)$$

where we can take advantage of the sparsity of $H'_R$ and obtain an efficient QR factorization.

ISWF: Solve

Once the Hessian matrix A (see FIG. 4) and the residue vector b have been constructed using all available information, the following linear equation is solved for:

$$A\delta x = b \quad (5)$$

to obtain the correction vector δx, which is used to update the states. Since the Hessian A is symmetric positive definite, and of size $(\alpha M+3N') \times (\alpha M+3N')$, the solving can be carried out as:
  Cholesky factorization of A: $O(\frac{1}{3}(\alpha M+3N')^3)$
  Two back-substitutions: $O((\alpha M+3N')^2)$ ISWF: Marginalization In order to maintain a constant-size sliding window of the robot poses, as well as a fixed number of SLAM features, the ISWF algorithm marginalizes old, matured states. There are three states to be marginalized out of the current state vector at each time step: the oldest robot pose $x_{C_{k-M+1}}$, the disappearing SLAM features $l_D$, and the robot state $x_{M_{k-1}}$. The purpose of the first two marginalizations is to keep a constant-size state vector, while the last marginalization is to keep each robot state as small as possible (i.e., only the necessary part is maintained, same as the cloned state in the MSCKF algorithm).

In terms of the Hessian matrix, the marginalization step requires the computation of the Schur complement of the states to be marginalized. In the sections that follows, the complexity of the marginalization, i.e., the complexity of computing the Schur complement in the Hessian, is analyzed since the computation of the residue vector is negligible in comparison (only matrix-vector multiplications and vector additions are involved). In particular, the case of marginalizing all three states at the same time is analyzed, while the states can also be marginalized sequentially one after another. These two ways result in the same Hessian but the computational complexities are different.

Figure 5:
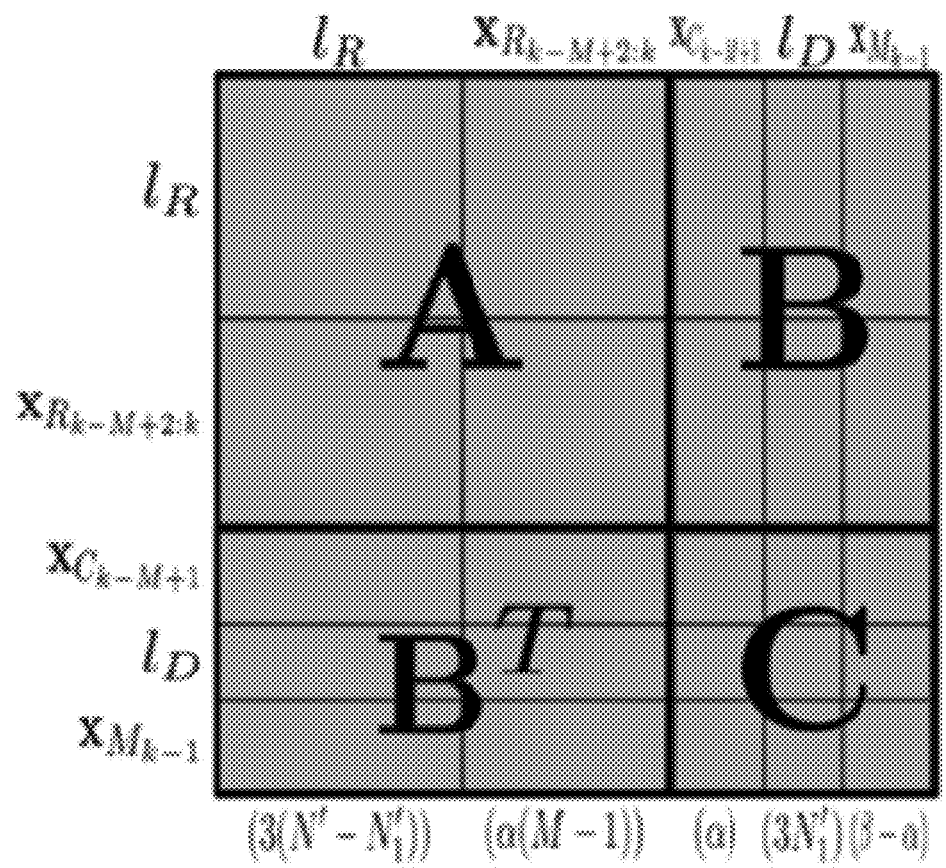
FIG. 5 illustrates the permuted Hessian matrix before marginalization.

FIG. 5 illustrates a permuted Hessian matrix before marginalization. The states to be kept are the remaining robot poses $x_{R_{k-M+2:k}}$, and the remaining SLAM feature states $l_R$. The states to be marginalized are the oldest robot pose $x_{R_{k-M+1}}$, the disappearing SLAM feature states $l_D$, and $x_{M_{k-1}}$, from the last but one robot pose. The size of each block is shown at the bottom.

Consider the Hessian matrix shown in FIG. 5, with the states to be marginalized permuted to the end. As can be seen the Hessian is fully dense (due to previous marginalization steps). The Schur complement of the block C is computed as:
  Compute $C^{-1}$: $O(\frac{2}{3}(3N_1'+\beta)^3)$
  Matrix multiplication $C^{-1}B^T$: $O((3N_1'+\beta)(\alpha M+3N')^2)$
  Matrix multiplication $BC^{-1}B^T$: $O(\frac{1}{2}(3N_1'+\beta)(\alpha M+3N')^2)$
  Matrix subtraction $A-BC^{-1}B^T$: $O(\frac{1}{2}(\alpha M+3N')^2)$ where symmetry has been taken into account.

ISWF: Covariance Recovery

As in the case of the MSCKF algorithm, Mahalanobis distance tests can be performed to reject outlier measurements. Hence, the covariance matrix for the states is needed. However, unlike the MSCKF, the covariance estimate is not available in the ISWF framework. Instead, what is available for use is the Hessian (information) matrix, which is the inverse of the covariance. Therefore, recovering the covariance is mathematically equivalent to computing the inverse of a known matrix (the Hessian).

Computing the inverse of a matrix, especially a large-sized one as is the case here, is in general computationally expensive and intractable. Note that, however, there are two facts that can be taken advantage of in the ISWF framework: First, only certain parts of the covariance matrix needs to be recovered, instead of the whole matrix; Second, the Cholesky factor of the Hessian matrix is available from the previous time step. By considering these two points, two methods for recovering the covariance efficiently are proposed.

Covariance Recovery: Method 1

This method starts from the Hessian matrix, and simply uses the Block Matrix Inversion (BMI) formula and the Matrix Inversion Lemma (MIL) to compute certain portions of the inverse of the Hessian.

Figure 6:
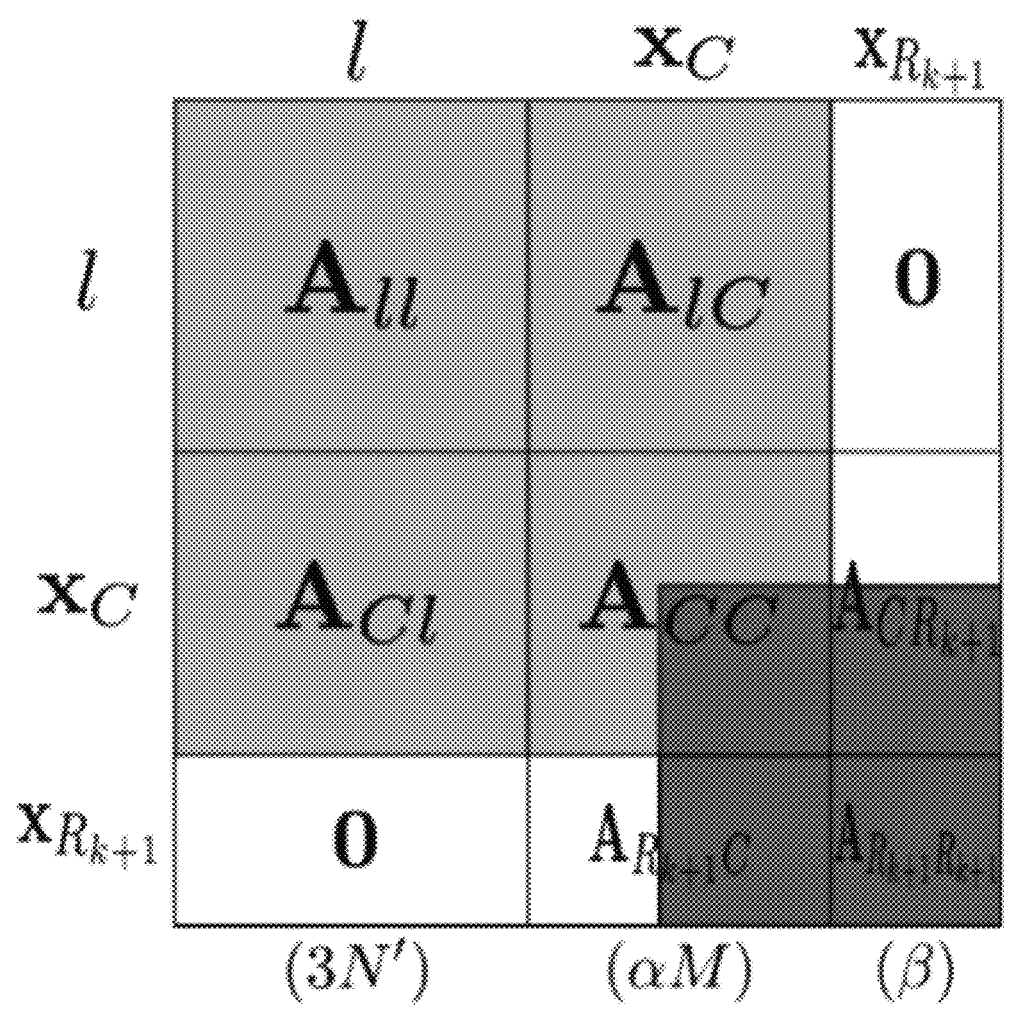

The Hessian matrix is available from the previous time step, and needs to be augmented with the new pose $x_{R_{k+1}}$ and the associated IMU information terms (see FIG. 6). In the figure, the Hessian is augmented with the new robot pose. The four darker blocks correspond to the IMU measurement information associated with the new pose $x_{R_{k+1}}$. The size of each block is shown at the bottom.

Figure 7:
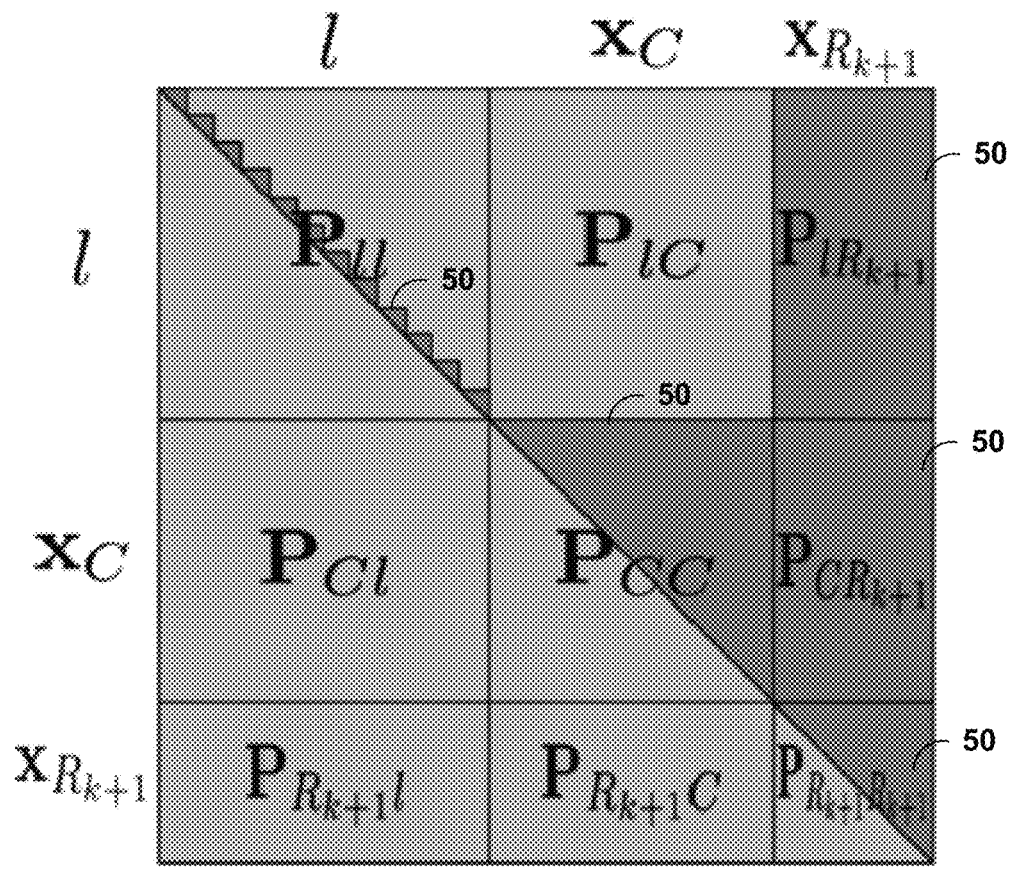
FIG. 7 illustrates the covariance matrix corresponding to the Hessian in FIG. 5.

Then, the parts of the inverse of this Hessian matrix that are necessary for the Mahalanobis distance test are computed (see FIG. 7): the block portion corresponding to all robot poses, the diagonal blocks corresponding to all SLAM feature states, and the cross terms between the new robot pose and the features. FIG. 7 depicts the covariance matrix corresponding to the Hessian in FIG. 6. The dark areas 50 indicate the necessary portions that need to be recovered for the Mahalanobis distance test. Note that since the covariance matrix, i.e., the inverse of the Hessian, is symmetric, only the upper triangular portions need to be recovered.

The BMI and the MIL state that:

$$\begin{bmatrix} A & B \\ B^T & C \end{bmatrix}^{-1} = \begin{bmatrix} A^{-1} + A^{-1}B(C-B^TA^{-1}B)^{-1}B^TA^{-1} & -A^{-1}B(C-B^TA^{-1}B)^{-1} \\ -(C-B^TA^{-1}B)^{-1}B^TA^{-1} & (C-B^TA^{-1}B)^{-1} \end{bmatrix} \quad (6)$$

Hence, in our case, we obtain $$P = \begin{bmatrix} A_{ll} & \vdots & A_{lC} & 0 \\ \cdots & \cdots & \cdots & \cdots \\ A_{Cl} & \vdots & A_{CC} & A_{CR_{k+1}} \\ 0 & \vdots & A_{R_{k+1}C} & A_{R_{k+1}R_{k+1}} \end{bmatrix}^{-1} = \quad (7)$$

$$\begin{bmatrix} A_{ll}^{-1} + A_{ll}^{-1}[A_{lC}\ 0]D\begin{bmatrix} A_{Cl} \\ 0 \end{bmatrix}A_{ll}^{-1} & -A_{ll}^{-1}[A_{lC}\ 0]D \\ -D\begin{bmatrix} A_{Cl} \\ 0 \end{bmatrix}A_{ll}^{-1} & D \end{bmatrix}$$

where $$D = \left(\begin{bmatrix} A_{CC} & A_{CR_{k+1}} \\ A_{R_{k+1}C} & A_{R_{k+1}R_{k+1}} \end{bmatrix} - \begin{bmatrix} A_{Cl} \\ 0 \end{bmatrix}A_{ll}^{-1}[A_{lC}\ 0]\right)^{-1} \quad (8)$$

Therefore, to recover the covariance, the following terms are computed sequentially:

$A_a^{-1}$ (matrix inversion of size $3N'\times 3N'$): $O(18N'^3)$ $A_a^{-1}A_{IC}$ (matrix multiplication of size $(3N'\times 3N')\times(3N'\times \alpha M)$): $O(9\alpha MN'^2)$ $$\begin{bmatrix} A_{CC} & A_{CR_{k+1}} \\ A_{R_{k+1}C} & A_{R_{k+1}R_{k+1}} \end{bmatrix} - \begin{bmatrix} A_{Cl} \\ 0 \end{bmatrix}A_{ll}^{-1}[A_{lC}\ 0]$$

(matrix multiplication and subtraction): $O(3/2(\alpha M)^2 N')$

D (matrix inversion of size $(\alpha M+\beta)\times(\alpha M+\beta)$): $O(\tfrac{2}{3}(\alpha M+\beta)^3)$ $P_{lR_{k+1}}$ (last block column of $-A_u^{-1}[A_{IC}\ 0]D$): $O(3\beta\alpha MN')$ Block diagonal of $P_a$ (diagonal blocks of $$A_{ll}^{-1} + A_{ll}^{-1}[A_{lC}\ 0]D\begin{bmatrix} A_{Cl} \\ 0 \end{bmatrix}A_{ll}^{-1}$$

using the available Cholesky factor of D): $O(3/2(\alpha M)^2 N')$ where efficiency is achieved by taking into account the symmetry wherever possible.

Covariance Recovery: Method 2

Figure 8A:
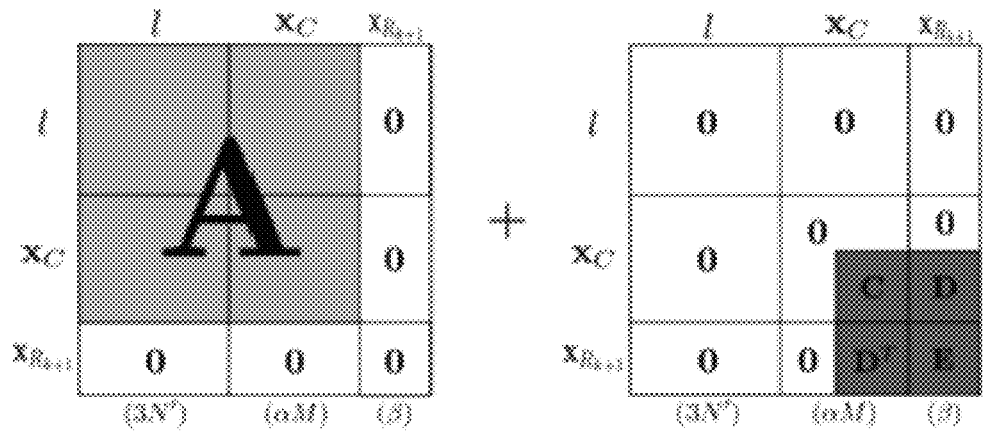
FIGS. 8A-8F are logical diagrams that graphically illustrate operations described herein.

In order to obtain the covariance more efficiently, one example technique makes use of the available Cholesky factor of the Hessian matrix from the previous time step. Specifically, in the solve process from the previous time step, the Cholesky factor R of the Hessian A has already been computed at that particular time instance. When the new robot pose $x_{R_{k+1}}$ is added, the new Hessian A" can be computed as equation (9) shown in FIG. 8A, where the blocks C, D, and E correspond to the information of the new IMU measurement associated with the new robot pose. Therefore, the new Hessian A" can be obtained by updating A, and hence, the Cholesky factor R" of A" can be efficiently obtained by updating R. Note that this new Hessian A" is slightly different than the Hessian in FIG. 7, since they are evaluated using different state estimates. In what follows, we describe a two-step method for updating the Cholesky factor R to eventually obtain R".

Factor Update: Step 1

Figure 8B:
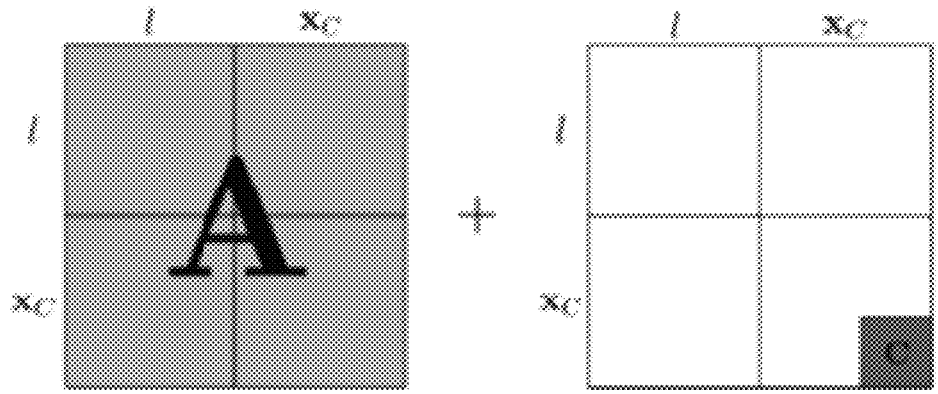

In this step, the Cholesky factor R' of the matrix A' is computed, where A' is shown as in equation (10) illustrated in FIG. 8B, and this can be done by the low-rank update of R. Specifically, let $C=FF^T$, then we have $$A'=A+VV^T \quad (11)$$

where $$V = \begin{bmatrix} 0 \\ F \end{bmatrix} \quad (12)$$

Given that $A = R^T R$, we want to find the Cholesky factor $R'$ of $A' = A + VV^T$ such that $R'^T R' = R^T R + VV^T$.

If we do Givens Rotation $C$ on $\begin{bmatrix} R \\ V^T \end{bmatrix}$ such that $$C\begin{bmatrix} R \\ V^T \end{bmatrix} = \begin{bmatrix} R' \\ 0 \end{bmatrix},$$

then we have $$R^T R + VV^T = [R^T\ V]\begin{bmatrix} R \\ V^T \end{bmatrix} = [R'^T\ 0]\begin{bmatrix} R' \\ 0 \end{bmatrix} = R'^T R',$$

since $C^T C = I$.

Figure 8C:
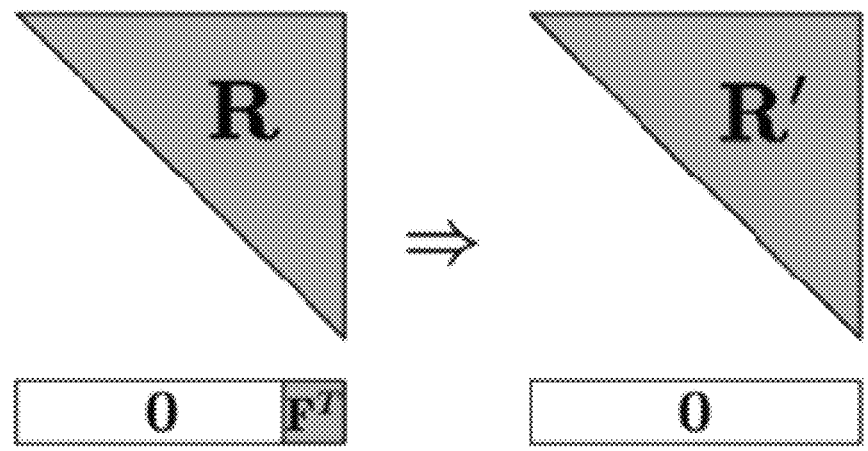

Hence, to obtain $R'$, we perform the Givens Rotation:

as illustrated in equation (13) shown in FIG. 8C. The size of F is $\beta\times\beta$, and hence the computational complexity of this low-rank Cholesky factor update is $O(\beta^3)$.

Factor Update: Step 2

Figure 8D:
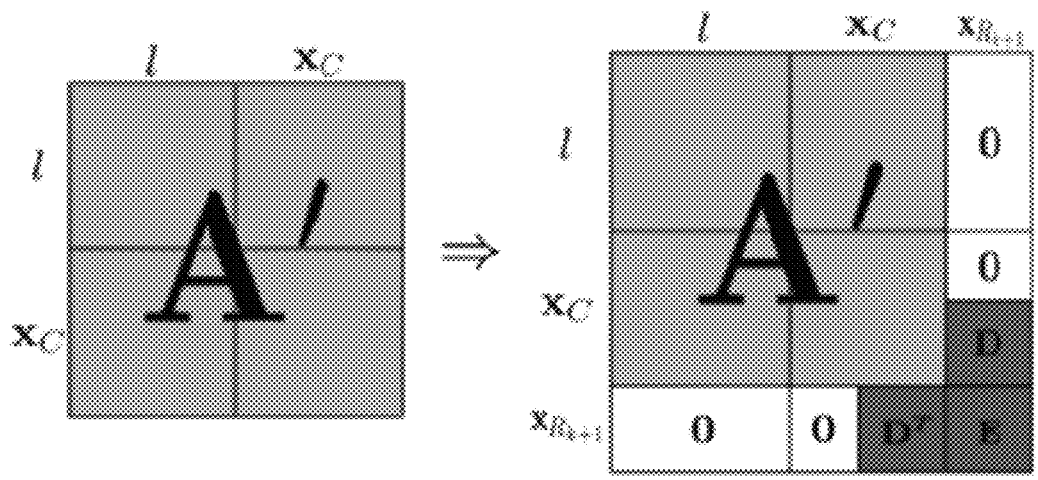
Figure 8E:
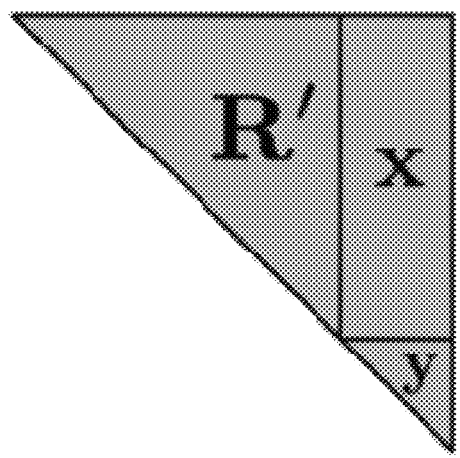
Figure 8F:
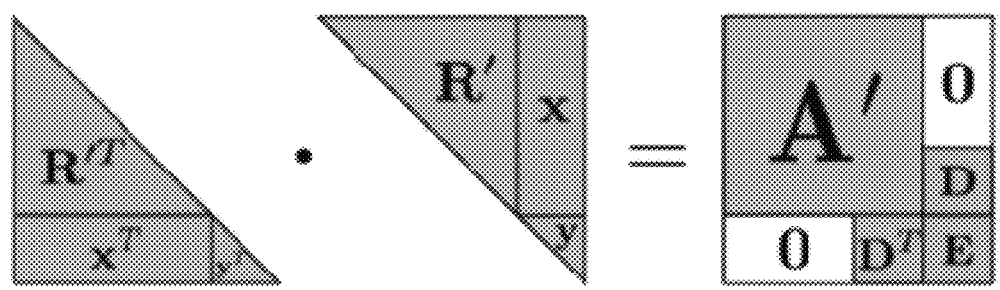

The second step finds the Cholesky factor R" of A", which can be obtained by augmenting A' as shown in equation (14) illustrated in FIG. 8D.

where the right matrix above is simply A". Hence, R" has the structure shown in FIG. 8E (15). From $R''^T R''=A''$, as shown in FIG. 8F (16) we have:

$$R'^T x = \begin{bmatrix} 0 \\ D \end{bmatrix} \quad (17)$$

$$y^T y = E - x^T x \quad (18)$$

Hence, x can be solved by forward-substitution, and y can be solved by doing a Cholesky factorization. Since both D and E are of size $\beta \times \beta$, x and y, hence R″, can be computed with complexity $O(\beta^3)$.

Now the Cholesky factor R″ of the new Hessian A″ is used to compute the covariance needed for the Mahalanobis distance test (see FIG. 7). Since $A''^{-1}=R''^{-1}R''^{-T}$, the covariance is recovered as follows:

$R''^{-1}$ (inversion of an upper-triangular matrix):

$$O\left(\frac{1}{6}(\alpha M + 3N')^3\right)$$

$R''^{-1}R''^{-T}$ (triangular matrix multiplication):

$$O\left(\frac{1}{6}(\alpha M)^3 + 6\alpha MN' + (3N')^2\right)$$

where taking advantage of the symmetry, only the necessary portions of the covariance matrix are computed.

MSCKF Vs. ISWF: Complexity Comparison

The following tables, summarize a and list the complexity for the ISWF techniques described and the and MSCKF algorithm.

Complexity Summary: MSCKF

| | |
|---|---|
| SLAM Maha. Test | $O(\eta_{new}N')$ |
| Feature Triangulation | $O\left(\sum_{j=1}^{N}\rho_j\right)$ |
| SLAM Initialization | $O((\alpha^2 + 4\alpha)M^3 + (6\alpha + 12)M^2N' + 9MN'^2)$ |
| MSCKF Maha. Test | $O\left(2\alpha^2\sum_{j=1}^{N}\rho_j^3\right)$ |
| MSCKF State Convariance Update | $O\left(\left(4\xi_1\alpha^2 + \frac{17}{6}\alpha^3\right)M^3 + \frac{15}{2}\alpha^2M^2N' + \frac{9}{2}\alpha MN'^2\right)$ |
| MSCKF State Only Update | $O\left(4\xi_2\alpha^2 + \frac{7}{3}\alpha^3\right)M^3 + \frac{9}{2}\alpha^2M^2N'$ |
| SLAM Update | $O\left(\frac{3}{2}N'(\alpha M + 3N')^2\right)$ |

Complexity Summary: ISWF

| | |
|---|---|
| Covariance Recovery | $O\left(\frac{1}{6}(\alpha M + 3N')^3 + \frac{1}{6}(\alpha M)^3\right)$ |
| SLAM Maha. Test | $O(\eta_{new}N')$ |
| Feature Triangulation | $O\left(\sum_{j=1}^{N}\varrho_j\right)$ |
| MSCKF Maha. Test | $O\left(2\alpha^2\sum_{j=1}^{N}\varrho_j^3\right)$ |
| Hessian Construction | $O\left(\alpha^2M^2\sum_{j=1}^{N}\varrho_j\right)$ |
| Solve | $O\left(\frac{1}{3}(\alpha M + 3N')^3\right)$ |
| Marginalization | $O\left(\frac{1}{2}(3N'_1 + \beta)(\alpha M + 3N')^2\right)$ |

Here the equivalence of two different methods for Hessian construction corresponding to the feature measurement information is proven:

1. Include the feature positions in the system's state. Construct the Hessian matrix with the Jacobians $H_R^j$ and $H_f^j$. Then marginalize the features from the state, i.e., do Schur complement on the Hessian with respect to the features.
2. Do not include the feature positions in the system's state. Construct the Hessian matrix with the Jacobian $H_R'^j$ directly.

where $H_R^j$ and $H_f^j$ are the Jacobians of the original feature measurement model with respect to all robot poses and the feature j position, respectively, $$\tilde{z}^j = H_R^j \tilde{x}_R + H_f^j \tilde{f}_j + n \quad (1.1)$$

and $H_R'^j$ is the Jacobian of the modified measurement model after the left null space technique. The measurement noise n is assumed to be zero-mean Gaussian with covariance R. For each feature j, j=1, . . . , N, method 1 constructs the following block row of the Jacobian matrix $$\left[0 \mid R^{-\frac{1}{2}}H_R^j \mid \ldots 0 \ldots R^{-\frac{1}{2}}H_f^j \ldots 0 \ldots\right] \quad (1.2)$$

Hence, after including the measurements for all the features, the Hessian has the following form:

$$\begin{bmatrix} 0 & 0 & & 0 & \\ \hline 0 & \sum_{j=1}^{N} H_R^{jT}R^{-1}H_R^j & \ldots & H_R^{jT}R^{-1}H_f^j & \ldots \\ & \vdots & \ddots & & \\ \hline 0 & H_f^{jT}R^{-1}H_R^j & & H_f^{jT}R^{-1} \mid H_f^j & \\ & \vdots & & & \ddots \end{bmatrix} \quad (1.3)$$

Then method 1 applies Schur complement on this Hessian matrix, resulting in the following Hessian:

$$\begin{bmatrix} 0 & 0 \\ \hline 0 & \sum_{j=1}^{N}\left(H_R^{jT}R^{-1}H_R^j - H_R^{jT}R^{-1}H_f^j\left(H_f^{jT}R^{-1}H_f^j\right)^{-1}H_f^{jT}R^{-1}H_R^j\right) \end{bmatrix} \quad (1.4)$$

Meanwhile, for method 2, it first applies the pre-whitening and the left null space technique to the measurement model 1.1:

$$\text{Whitening: } R^{-1/2}\tilde{z}^j = R^{-1/2}H_R^j\tilde{x}_R + R^{-1/2}H_f^j\tilde{f}_j + R^{-1/2}n \quad (1.5)$$

$$\text{LNS: } U_j^T R^{-1/2}\tilde{z}^j = U_j^T R^{-1/2}H_R^j\tilde{x}_R + U_j^T R^{-1/2}n \quad (1.6)$$

where $U_j^T R^{-1/2} H_f^j = 0$ and $U_j^T U_j = I$. Then, method 2 uses the Jacobian $H_R^{ij} = U_j^T R^{-1/2} H_R^j$ to construct the Hessian. After including the measurements for all the features, the Hessian has the following form:

$$\begin{bmatrix} 0 & 0 \\ 0 & \sum_{j=1}^{N} \left( H_R^{jT} R^{-T/2} U_j U_j^T R^{-1/2} H_R^j \right) \end{bmatrix} \quad (1.7)$$

In what follows, we prove that (1.4) equals (1.7), i.e., $$H_R^T R^{-T/2} U U^T R^{-1/2} H_R = \qquad (1.8)$$
$$H_R^T R^{-1} H_R - H_R^T R^{-1} H_f (H_f^T R^{-1} H_f)^{-1} H_f^T R^{-1} H_R$$

$$\Leftrightarrow H_R^T \left( R^{-\frac{T}{2}} U U^T R^{-\frac{1}{2}} - R^{-1} + R^{-1} H_f (H_f^T R^{-1} H_f)^{-1} H_f^T R^{-1} \right) H_R \qquad (1.9)$$

where we have dropped the feature index j for the purpose of clarity.

Let $X = R^{-T/2} U U^T R^{-1/2}$, $Y = R^{-1} - R^{-1} H_f (H_f^T R^{-1} H_f)^{-1} H_f^T R^{-1}$. It suffices to show that: $X = Y$. Since $U^T R^{-1/2} H_f = 0$ and $U^T U = I$, we have:

$$XH_f = 0, YH_f = 0 \Rightarrow (X-Y)H_f = 0 \qquad (1.11)$$

$$XR^{1/2}U = R^{-T/2}U, YR^{1/2}U = R^{-T/2}U \Rightarrow (X-Y)R^{1/2}U = 0 \qquad (1.12)$$

which gives:

$$(X-Y)[H_f R^{1/2} U] \qquad (1.13)$$

Since $[H_f R^{1/2} U]$ is a full rank square matrix, the following is obtained:

$$X - Y = 0 \qquad (1.14)$$

$$\Leftrightarrow X = Y \qquad (1.15)$$

Hence, 1.4 equals 1.7, i.e., the two methods arrive at the same final Hessian matrix.

A Square Root Inverse Filter for Efficient Vision-Aided Inertial Navigation on Mobile Devices The following sections describe a detailed example of a square root inverse filter for efficient vision-aided inertial navigation on resource limited devices, such as mobile devices. While regular inverse filters suffer from numerical issues, employing their square-root equivalent enables the usage of single-precision number representations, thus achieving considerable speed ups as compared to double-precision alternatives on resource-constrained mobile platforms. Besides a detailed description of the SR-ISWF for VINS, which focuses on the numerical procedures that enable exploiting the problem's structure for gaining in efficiency, this paper presents a thorough validation of the algorithm's processing requirements and achieved accuracy. In particular, experiments are conducted using a commercial-grade cell phone, where the proposed algorithm is shown to achieve the same level of estimation accuracy, when compared to state-of-the-art VINS algorithms, with significantly higher speed.

One of the main challenges of the INVF is its poor numerical properties in general, but primarily for VINS. Specifically, the Hessian matrix employed by the INVF is typically ill-conditioned (i.e., condition number $10^9$ or higher), which may necessitate using double-precision arithmetic, else the numerical errors can easily become the dominant error source affecting estimation accuracy, or even cause the filter to diverge. The condition number of the square root matrix is the square root of the condition number of the corresponding Hessian matrix. Achieving efficient VINS solutions on mobile devices, however, requires single-precision arithmetic for the following reasons: i) A 32-bit single-precision representation occupies less hardware resources, and the corresponding operations are likely to be faster, than 64-bit double-precision representations, and ii) most current mobile devices feature ARM NEON coprocessors that provide a 4-fold processing speed increase when using 32-bit number representations.

The techniques described below take advantage of the structure of the VINS problem when formulated as an inverse square root filter to achieve computational gains that allow operating in real time on mobile devices. Specifically, a square root inverse sliding window filter (SR-ISWF) is described for VINS, which maintains the upper triangular Cholesky factor of the Hessian matrix of a sliding window of recent states. The VINS implementation described below is able to operate in real time on resource-constrained devices, specifically, cell phones. The implementation achieves more than double the speed, with comparable accuracy, of prior multi-state constraint Kalman filters, which has been successfully demonstrated on mobile devices. The described SR-ISWF for VINS handles limitations of low-cost devices, by estimating on-the-fly the IMU-camera extrinsic calibration parameters, time synchronization, and the camera's rolling shutter time.

A. System State

At each time step k, the system maintains the following state vector $$x_k = [x_S^T x_{C_{k-M+1}}^T \ldots x_{C_k}^T x_P^T x_{E_k}^T]^T \qquad (1)$$

where $x_S$ is the state vector of the current SLAM features under estimation, with $x_S = [{}^G p_{f_1}^T \ldots {}^G p_{f_n}^T]^T$, and ${}^G p_{f_j}$, for $j = 1, \ldots, n$, denotes the Euclidean coordinates of the point feature $f_j$ in the global frame $\{G\}$, $x_{C_i}$, for $i = k+M-1, \ldots, k$, represents the state vector of the cloned[2] IMU poses at time step i, where M is the size of the sliding window. Each cloned state is defined as $$x_{C_i} = [{}^{I_i} q_G^T {}^G p_{I_i}^T t_{d_i}]^T \qquad (2)$$

where ${}^{I_i} q_G$ is the quaternion representation of the orientation of the global frame $\{G\}$ in the IMU's frame of reference $\{I_i\}$, ${}^G p_{I_i}$ is the position of $\{I_i\}$ in $\{G\}$, and $t_{d_i}$ is the IMU-camera time offset,[3] at time step i, similar to the definition in [8]. The parameter state vector, $x_P$, consists of the constant parameters:

$$x_P = [{}^I q_C^T {}^I p_C^T t_r]^T \qquad (3)$$

where ${}^I q_C$ is the quaternion representation of the orientation of the camera frame $\{C\}$ in the IMU's frame of reference $\{I\}$. ${}^I p_C$ is the position of $\{C\}$ in $\{I\}$, and $t_r$ is the rolling-shutter time of the camera (i.e., the readout time of each image, which is constant). Finally, the states necessary for modelling the IMU biases and determining the sensor's current speed are kept in $$x_{E_k} = [b_{g_k}^T {}^G v_{I_k}^T b_{a_k}^T]^T \qquad (4)$$

where $b_{g_k}$ and $b_{a_k}$ correspond to the gyroscope and accelerometer biases, respectively, and ${}^G v_{I_k}$ is the velocity of $\{I\}$ in $\{G\}$, at time step k.

B. Inertial Measurement Equations and Corresponding Cost Terms

The IMU provides measurements of the device's rotational velocity and linear acceleration contaminated by white Gaussian noise and time-varying biases. The biases are modelled as random walks driven by white, zero-mean Gaussian noise processes $n_{wg}(t)$ and $n_{wa}(t)$ [see (6)], while the gyroscope and accelerometer measurements, $\omega_m(t)$ and $a_m(t)$ are:

$$\omega_m(t) = {}^I\omega(t) + b_g(t) + n_g(t)$$

$$a_m(t) = C({}^I q_G(t))({}^G a(t) - {}^G g) + b_a(t) + n_a(t) \quad (5)$$

where the noise terms, $n_g(t)$ and $n_a(t)$ are modelled as zero-mean, white Gaussian noise processes, while the gravitational acceleration ${}^G g$ is considered a known deterministic constant. The device's rotational velocity ${}^I\omega(t)$ and linear acceleration ${}^G a(t)$, in (5), can be used to relate consecutive IMU poses through the device's continuous-time system equations:

$$\begin{aligned}
{}^I\dot{q}_G(t) &= \frac{1}{2}\Omega(\omega_m(t) - b_g(t) - n_g(t)){}^I q_G(t) \\
{}^G\dot{v}_I(t) &= C({}^I q_G(t))^T(a_m(t) - b_a(t) - n_a(t)) + {}^G g \\
{}^G\dot{p}_I(t) &= {}^G v_I(t) \quad \dot{b}_a(t) = n_{wa}(t) \quad \dot{b}_g(t) = n_{wg}(t) \\
{}^I\dot{q}_C(t) &= 0 \quad {}^I\dot{p}_C(t) = 0 \quad \dot{t}_d(t) = n_{td}(t) \quad \dot{t}_r(t) = 0
\end{aligned} \quad (6)$$

where, $$\Omega(\omega) \triangleq \begin{bmatrix} -\lfloor\omega\rfloor & \omega \\ -\omega^T & 0 \end{bmatrix}$$

for $\omega \in \mathbb{R}^3$, and the IMU-camera time offset $t_d$ is modelled as random walk driven by the white zero-mean Gaussian noise process $n_{td}$.

Given the inertial measurements $u_{k,k+1} = [w_{m_k}^T a_{m_k}^T]^T$, analytical integration of (6) within the time interval $[t_k, t_{k+1}]$ is used to determine the discrete-time system equations [24], which imposes a constraint between the consecutive states $x_{I_k}$ and $x_{I_{k+1}}$ as:

$$x_{I_{k+1}} = f(x_{I_k}, u_{k,k+1}, w_{k,k+1}) \quad (7)$$

where $x_{I_k} = [x_{C_k}^T x_{E_k}^T]^T$, and $w_{k,k+1}$ is the discrete-time zero-mean white Gaussian noise affecting the IMU measurements with covariance $Q_k$.

Linearizing (7), around the state estimates $\hat{x}_{I_k}$ and $\hat{x}_{I_{k+1}}$, results in the following IMU measurement model, relating the error states $\tilde{x}_{I_k}$ and $\tilde{x}_{I_{k+1}}$:

$$\tilde{x}_{I_{k+1}} = (f(\hat{x}_{I_k}, u_{k,k+1}) - \hat{x}_{I_{k+1}}) + \Phi_{k+1,k}\tilde{x}_{I_k} + G_{k+1,k} w_{k,k+1} \quad (8)$$

where $\Phi_{k+1,k}$ and $G_{k+1,k}$ are the corresponding Jacobians. In this paper, we define the error state $\tilde{x}$ as the difference between the true state $x$ and the state estimate $\hat{x}$ employed for linearization (i.e., $\tilde{x} = x - \hat{x}$), while for the quaternion $q$ we employ a multiplicative error model $$\tilde{q} = q \otimes \hat{q}^{-1} \simeq \begin{bmatrix} \frac{1}{2}\delta\theta^T & 1 \end{bmatrix}^T,$$

where $\delta\theta$ is a minimal representation of the attitude error.

Hence, the inertial measurements $u_{k,k+1}$ contribute a linearized cost term of the form:

$$C_u(\tilde{x}_{I_k}, \tilde{x}_{I_{k+1}}) = \|[\Phi_{k+1,k} \quad -I]\begin{bmatrix} \tilde{x}_{I_k} \\ \tilde{x}_{I_{k+1}} \end{bmatrix} - (\hat{x}_{I_{k+1}} - f(\hat{x}_{I_k}, u_{k,k+1}))\|_{Q'_k}^2 \quad (9)$$

where $Q'_k = G_{k+1,k} Q_k G_{k+1,k}^T$.

C. Visual Measurement Equations and Corresponding Cost Terms

We use point features extracted from consecutive images as visual measurements to be processed by the estimator. When working with commercial-grade mobile devices (e.g., cell phones), the images suffer from the rolling-shutter effect, that is the image pixel rows are read sequentially in time, so each row has a different actual observation time. In addition, there exists a time-varying offset between the IMU and the camera's time stamps (i.e., the two clocks are not synchronized). To handle these issues, we use the interpolation model of [8], where each camera pose is interpolated using the two closest cloned poses. In particular, the measurement model is:

$$z_k^j = h({}^{C_{k+i}} p_{f_j}) + n_k^j = \pi({}^{C_{k+i}} p_{f_j}) + n_k^j \quad (10)$$

with $$\pi([x \; y \; z]^T) = \begin{bmatrix} \frac{x}{z} & \frac{y}{z} \end{bmatrix}^T,$$

where ${}^{C_{k+i}} p_{f_j}$ is the feature position expressed in the camera frame of reference at the exact image-acquisition time instant, $n_k^j$ is zero-mean, white Gaussian noise with covariance $\sigma^2 I_2$, and $I_2$ is the 2×2 identity matrix. Note that without loss of generality, we express the feature measurement (10) in normalized pixel coordinates, after we perform intrinsic camera calibration offline [3]. Linearizing (10) around current state estimates (where the feature positions are obtained through triangulation using all the measurements in the current window) yields:

$$\tilde{z}_k^j = H_{x,k}^j \tilde{x}_F + H_{f,k}^j {}^G\tilde{p}_{f_j} + n_k^j \quad (11)$$

where $H_{x,k}^j$ and $H_{f,k}^j$ are the corresponding Jacobians evaluated at the state estimate $\hat{x}_k$, and we define $$x_F = [x_{C_{k-M+1}}^T \ldots x_{C_k}^T x_P^T x_{E_k}^T]^T \quad (12)$$

which is the state vector comprising all current states except the SLAM features. Stacking together all $N_j$ observations to this feature, we get:

$$\tilde{z}_j = H_x^j \tilde{x}_F + H_f^j {}^G\tilde{p}_{f_j} + n^j \quad (13)$$

Consider a square orthonormal matrix $Q_j$, partitioned as $Q_j = [S_j \; U_j]$, where the 3 columns of $S_j$ span the column space of $H_f^j$, while the $2N_j - 3$ rows of $U_j$, its left nullspace. Then, the visual measurements $z^j$ contribute a linearized cost term:

$$C_z(\tilde{x}_F, {}^G\tilde{p}_{f_j}) = \|H_x^j \tilde{x}_F + H_f^j {}^G\tilde{p}_{f_j} - \tilde{z}^j\|_{\sigma^2 I_{2N_j}}^2 \quad (14)$$

$$= \|Q_j^T H_x^j \tilde{x}_F + Q_j^T H_f^j {}^G\tilde{p}_{f_j} - Q_j^T \tilde{z}^j\|_{\sigma^2 I_{2N_j}}^2$$

$$= \|S_j^T H_x^j \tilde{x}_F + S_j^T H_f^j {}^G\tilde{p}_{f_j} - S_j^T \tilde{z}^j\|_{\sigma^2 I_3}^2 +$$

$$\|U_j^T H_x^j \tilde{x}_F - U_j^T \tilde{z}^j\|_{\sigma^2 I_{2N_j-3}}^2$$

$$= \|F_1^j \tilde{x}_F + R_f^j {}^G\tilde{p}_{f_j} - \tilde{z}_1^j\|_{\sigma^2 I_3}^2 + \quad (15)$$

$$\|F_2^j \tilde{x}_F - \tilde{z}_2^j\|_{\sigma^2 I_{2N_j-3}}^2 \quad (16)$$

$$= C_{z,1}(\tilde{x}_F, {}^G\tilde{p}_{f_j}) + C_{z,2}(\tilde{x}_F) \quad (17)$$

-continued with $$F_1^j \triangleq S_j^T H_x^j \quad F_2^j \triangleq U_j^T H_x^j \quad R_f^j \triangleq S_j^T H_f^j \quad (18)$$

$$\check{z}_1^j \triangleq S_j^T z^j \quad \check{z}_2^j \triangleq U_j^T z^j$$

To perform the above orthonormal transformation, i.e., to compute (18), we apply Givens rotations [7] (pages 252-253) to triangularize $H_f^j$, while the other quantities are obtained in place through the Givens process. As a result of this Givens, in (18), the Jacobian $R_f^j$ is square and upper-triangular, while $F_2^j$ is block upper-triangular. These structures will lead us to efficient update steps later on.

D. Visual-Information Management

Our VINS employs two types of visual measurements, as in [20, 21, 16], so as to provide high estimation accuracy while remaining computationally efficient. Hence, we designed an information management module, which classifies the observed features, so as to be appropriately processed, into two categories:

- SLAM features: These features are added in the state vector (1) and updated across time. In terms of the cost function in (17), $C_{z^1}$ is used for initializing new SLAM features, while $C_{z^2}$ is exploited for state update.

By maintaining a structure of the scene, SLAM features increase the estimation accuracy and improve the estimator's robustness, especially when viewed over many frames. This, however, comes at higher cost as compared to the MSCKF features (described later on). Hence, the information manager selects as new SLAM features those whose tracks span the entire sliding window (since these tracks are likely to last longer), while limits the number of SLAM features in the estimator. Once a SLAM feature is successfully initialized by the filter, it stays in the VINS state vector until the track is lost (i.e., when this feature is no longer observed by the newest pose in the sliding window); then this feature will be marginalized and removed from the state vector. Note that this is still a sliding window scheme though SLAM features can stay longer than the window-size duration dictates.

- MSCKF features: These features are processed as in the MSC-KF approach [20], hence the name,[4] where the feature states are marginalized from the measurement equation (13) to generate constraints between poses. Compared with SLAM, this approach directly exploits the cost term $C_{z^2}$ in (17). Note, however, that all the information on the poses from the measurements is absorbed into $C_{z^2}$, since $C_{z^1}$ contains only information about the feature's position.

MSCKF feature measurements provide "local" information relating multiple poses in each sliding window. They require less computations than SLAM since their feature states are not directly estimated. After the SLAM features have been selected, the information manager classifies all the remaining feature tracks into the MSCKF category.

Finally, and in order to address the processing limitations of resource-constrained platforms, the information manager trades estimation accuracy for computational efficiency, by limiting the number of features processed in each update. Moreover, MSCKF features are selected based on their track lengths, with higher priority given to the longer tracks.

III. Estimation Algorithm Description

In this section, we describe in detail the main steps of the SR-ISWF algorithm. Our presentation will be from the cost function perspective: We first show the effect that each step has on the cost function being minimized, and then present the corresponding equations, with special attention to specific problem structures for efficient implementation.

At each time step k, our objective is to minimize the cost function $C_k^\oplus$ that contains all the information available so far:

$$C_k^\oplus = C_{k-1} + C_u + C_{Z_R} + C_{Z_S} + C_{Z_M} \quad (19)$$
$$= C_{k-1} + C_u + C_{Z_R} + C_{Z_S^1} + C_{Z_S^2} + C_{Z_M^2}$$

where $C_u$ represents the cost term arising from the IMU measurement $u_{k-1,k}$, $C_{Z_R}$ from the visual re-observations of the active SLAM features, $C_{Z_S}$ from the camera measurements to new SLAM features (to be initialized), and $C_{Z_M}$ from the visual measurements to the MSCKF features. The new-SLAM cost term is further split into $C_{Z_S^1}$ and $C_{Z_S^2}$, while the MSCKF cost term only consists of $C_{Z_M^2}$, according to (17) (see Sect. II-D). Finally, all the prior information obtained from the previous time step is contained in $$C_{k-1}(\tilde{x}_{k-1}) = \|\mathbf{R}_{k-1}\tilde{x}_{k-1} - r_{k-1}\|^2 \quad (20)$$

where $\|\cdot\|$ denotes the standard vector 2-norm, $R_{k-1}$ and $r_{k-1}$ are the prior (upper-triangular) information factor matrix (i.e., the square root of the Hessian) and residual vector, respectively, and $\tilde{x}_{k-1} = x_{k-1} - \hat{x}_{k-1}$ the error state from time step k−1 [see (1)]. Note that in (20), $r_{k-1} = 0$ and will be updated along with the information factor $R_{k-1}$.

We hereafter describe how the SR-ISWF algorithm combines each cost term in (19) to eventually obtain $C_k^\oplus$. Meanwhile, we will show how the system's state vector evolves from $x_{k-1}$ to $x_k$. An overview of the SR-ISWF algorithm is shown in Algorithm 1.

---

Algorithm 1 SR-ISWF

---

Input:
    Prior estimate $\hat{x}_{k-1}$
    Upper-triangular prior information factor $R_{k-1}$
    Intertial measurements $u_{k-1,k}$
    SLAM re-observation measurements $Z_R$
    New SLAM measumments $Z_S$
    MSCKF feature measurements $Z_M$
Function Steps:
    Propagation [see (23)]
    Marginalization [see (28)]
    Covariance factor recovery [see (33)]
    Information factor update:
        SLAM re-observations [see (37)]
        New SLAM features initialization [see (45)]
        New SLAM & MSCKF pose constraints [see (50) and (48)]
    State update [see (53) and (54)]

---

A. Propagation

In our sliding window, a new pose state $x_{I_k}$ [see (7)] is added to the current state vector at each time step k:

$$x_k^\ominus = [x_{k-1}^T \, x_{I_k}^T]^T \quad (21)$$

using the IMU measurement $u_{k-1,k}$. Hence the cost function, which initially comprised only the prior $C_{k-1}$, becomes $$C_k^{\ominus}(\tilde{x}_k^{\ominus}) = C_{k-1}(\tilde{x}_{k-1}) + C_u(\tilde{x}_{I_{k-1}}, \tilde{x}_{I_k}) \quad (22)$$

$$= \|R_{k-1}\tilde{x}_{k-1} - r_{k-1}\|^2 + \left\|[\Phi_{k,k-1} \ -I]\begin{bmatrix}\tilde{x}_{I_{k-1}} \\ \tilde{x}_{I_k}\end{bmatrix} - (\hat{x}_{I_k} - f(\hat{x}_{I_{k-1}}, u_{k-1,k}))\right\|_{Q_k'}^2$$

$$= \|R_k^{\ominus}\tilde{x}_k^{\ominus} - r_k^{\ominus}\|^2$$

from (20) and (9), with $$R_k^{\ominus} = \begin{bmatrix} R_{k-1} & 0 \\ V_1 & V_2 \end{bmatrix}, \quad V_2 = -Q_k'^{-\frac{1}{2}} \quad (23)$$

$$V_1 = \begin{bmatrix} 0 \ \ldots \ 0 & Q_k'^{-\frac{1}{2}}\Phi_{k,k-1}^{(C)} & 0 \ \ldots \ 0 & Q_k'^{-\frac{1}{2}}\Phi_{k,k-1}^{(E)} \end{bmatrix}$$

$$r_k^{\ominus} = \begin{bmatrix} r_{k-1} \\ Q_k'^{-\frac{1}{2}}(x_{I_k} - f(\hat{x}_{I_{k-1}}, u_{k-1,k})) \end{bmatrix}$$

where $\Phi_{k,k-1}^{(C)}$ and $\Phi_{k,k-1}^{(E)}$ are block columns of the Jacobian $\Phi_{k,k-1}$ with respect to the clone and extra IMU states [see (2) and (4)], respectively. And here $r_k^{\ominus} = 0$, since $r_{k-1} = 0$ and $\hat{x}_{I_k} = f(\hat{x}_{I_{k-1}}, u_{k-1,k})$ from state propagation (7). Note that the resulting factor $R_k^{\ominus}$ is not upper-triangular in (23), but will be triangularized in the next step.

B. Marginalization

To maintain constant computational complexity, at time step k, the SR-ISWF marginalizes the following states: Past SLAM features, $\tilde{x}_{DS}$, whose tracks are lost (DS for "disappeared SLAM"), the oldest clone $\tilde{x}_{C_{k-M}}$, and the extra IMU states $\tilde{x}_{E_{k-1}}$ from the previous time step. If we define the (error) state vector consisting of all states to be marginalized as $$\tilde{x}_k^M = [\tilde{x}_{DS}^T \tilde{x}_{C_{k-M}}^T \tilde{x}_{E_{k-1}}^T]^T \quad (24)$$

and denote $\tilde{x}_k^R$ the remaining states [following the structure in (1)] after removing $\tilde{x}_k^M$ from $\tilde{x}_k^{\ominus}$, then we can write $$P_M \tilde{x}_k^{\ominus} = [\tilde{x}_k^{MT} \tilde{x}_k^{RT}]^T \quad (25)$$

where $P_M$ is a permutation matrix. In terms of the cost function, marginalization corresponds to removing $\tilde{x}_k^M$ from the cost function by minimizing with respect to it, i.e., $$C_k^M(\tilde{x}_k^R) = \min_{\tilde{x}_k^M} C_k^{\ominus}(\tilde{x}_k^{\ominus}) = \min_{\tilde{x}_k^M} C_k^{\ominus}(\tilde{x}_k^M, \tilde{x}_k^R) \quad (26)$$

Combining (22) and (25), we obtain:

$$C_k^{\ominus}(\tilde{x}_k^M, \tilde{x}_k^R) = \|R_k^{\ominus}\tilde{x}_k^{\ominus} - r_k^{\ominus}\|^2 \quad (27)$$

$$= \|R_k^{\ominus} P_M^T P_M \tilde{x}_k^{\ominus} - r_k^{\ominus}\|^2$$

$$= \left\|R_k^{\ominus} P_M^T \begin{bmatrix}\tilde{x}_k^M \\ \tilde{x}_k^R\end{bmatrix} - r_k^{\ominus}\right\|^2$$

After performing QR factorization [7] (pages 248-250) on the column-permuted factor matrix $R_k^{\ominus} P_M^T$ $$R_k^{\ominus} P_M^T = [Q^M \ Q^R] \begin{bmatrix} R_k^M & R_k^{MR} \\ 0 & R_k^R \end{bmatrix}, \quad (28)$$

(27) is written as $$C_k^{\ominus}(\tilde{x}_k^M, \tilde{x}_k^R) = \left\|\begin{bmatrix} R_k^M & R_k^{MR} \\ 0 & R_k^R \end{bmatrix}\begin{bmatrix}\tilde{x}_k^M \\ \tilde{x}_k^R\end{bmatrix} - \begin{bmatrix} Q^{MT} \\ Q^{RT} \end{bmatrix} r_k^{\ominus}\right\|^2 \quad (29)$$

$$= \|R_k^M \tilde{x}_k^M + R_k^{MR}\tilde{x}_k^R - Q^{MT} r_k^{\ominus}\|^2 +$$

$$\|R_k^R \tilde{x}_k^M - Q^{RT} r_k^{\ominus}\|^2$$

Since $R_k^M$ is invertible (from the QR process), for any $\tilde{x}_k^R$, there always exists an $\tilde{x}_k^M$ that makes the first cost term in (29) zero. Hence, combining (26) and (29), the cost function after marginalization becomes $$C_k^M(\tilde{x}_k^R) = \min_{\tilde{x}_k^M} C_k^{\ominus}(\tilde{x}_k^M, \tilde{x}_k^R) = \|R_k^R \tilde{x}_k^R - r_k^R\|^2 \quad (30)$$

where $r_k^R = Q^{RT} r_k^{\ominus} = 0$ since $r_k^{\ominus} = 0$.

C. Covariance Factor Recovery

Before employing visual measurement updates, a robust VINS system requires an outlier rejection module. In addition to the 2-Point RANSAC [13], our SR-ISWF employs the standard Mahalanobis distance test:

$$\gamma = \tilde{z}^T S^{-1} \tilde{z}, S = HPH^T + \sigma^2 I \quad (31)$$

where $\gamma$, $\tilde{z}$, $S$, $H$, $P$, $\sigma$ represent the Mahalanobis distance, measurement residual, residual covariance, measurement Jacobian, covariance matrix, and measurement noise standard deviation, respectively, for any measurement z. Among these quantities, the only one not available is the covariance matrix P, which when expressed as the inverse of the Hessian matrix, equals:

$$P = (R_k^{RT} R_k^R)^{-1} = R_k^{R-1} R_k^{R-T} = U_P U_P^T \quad (32)$$

$$U_P = R_k^{R-1} \quad (33)$$

with $U_p$ upper-triangular. Hence. S can be expressed as $$S = BB^T + \sigma^2 I, B = HU_p \quad (34)$$

Note that this way we need not compute explicitly the covariance matrix P, which is numerically unstable since it shares the same condition number as the Hessian.

D. Update: SLAM Re-Observations

Re-observations $\tilde{z}_R$ of existing SLAM features are used to perform updates. Specifically, all such measurements contribute a cost term $C\tilde{z}_R$ as in (19), and thus [see (30) and (14)] the cost function becomes:

$$C_k^{SR}(\tilde{x}_k^R) = C_k^M(\tilde{x}_k^R) + C_{\tilde{z}_n}(\tilde{x}_k^R) \quad (35)$$

$$= \|R_k^R \tilde{x}_k^R - r_k^R\|^2 + \|H_{SR}\tilde{x}_k^R - \tilde{z}_R\|_{\sigma^2 I}^2$$

$$= \left\|\begin{bmatrix} R_k^R \\ \frac{1}{\sigma}H_{SR} \end{bmatrix}\tilde{x}_k^R - \begin{bmatrix} r_k^R \\ \frac{1}{\sigma}\tilde{z}_R \end{bmatrix}\right\|^2$$

where $$H_{SR} = \begin{bmatrix} \vdots \\ H_{SR}^j \\ \vdots \end{bmatrix}, \tilde{z}_R = \begin{bmatrix} \vdots \\ \tilde{z}_R^j \\ \vdots \end{bmatrix} \quad (36)$$

$$H_{SR}^j = [\, 0 \, \ldots \, 0 \quad H_f^j \quad 0 \, \ldots \, 0 \quad H_x^j \quad 0 \, \ldots \, 0 \,]$$

for $j=1, \ldots, N_{SR}$, with $N_{SR}$ the total number of SLAM re-observation measurements, and the Jacobians $H_f^j$, $H_x^j$ and the residual $\tilde{z}_R^j$ are as in (13). If we perform the following thin QR factorization [7] (page 248):

$$\begin{bmatrix} R_k^R \\ \frac{1}{\sigma} H_{SR} \end{bmatrix} = Q^{SR} R^{SR} \quad (37)$$

Then, from (35), and after dropping a constant term, the cost function after the SLAM re-observation update becomes $$C_k^{SR}(\tilde{x}_k^R) = \| R_k^{SR} \tilde{x}_k^R - r_k^{SR} \|^2 \quad (38)$$

with $$r_k^{SR} = Q^{SR^T} \begin{bmatrix} r_k^R \\ \frac{1}{\sigma} \tilde{z}_R \end{bmatrix} \quad (39)$$

The QR factorization in (37) is carried out very efficiently by taking advantage of the fact that $R_k^R$ is upper-triangular. Furthermore, $r_k^{SR}$ is obtained in place during the QR process (i.e., $Q^{SR}$ does not need to be formed explicitly).

E. Update: New SLAM Features Initialization

When new SLAM features become available (i.e., points whose tracks span the entire window), the SR-ISWF adds them in the state vector and updates the information factor accordingly. Recall that at this point, the system's state vector has the following structure [see (1) and (12)]:

$$x_k^R = [x_S^T x_F^T]^T \quad (40)$$

and after adding the new SLAM features it becomes $$x_k = [x_S^T x_S^{N^T} x_F^T]^T \quad (41)$$

where the new $N_{NS}$ SLAM feature states, $$x_S^N = \begin{bmatrix} {}^G p_{f_1}^T & \ldots & {}^G p_{f_{N_{NS}}}^T \end{bmatrix}^T,$$

are appended to the end of the existing SLAM states, $x_S$.

As shown in (19), the cost term corresponding to the information from the new SLAM feature measurements, $C_{Z_S}$ is split into two parts (17): $C_{Z_S^1}$ contains all the information on the features, while $C_{Z_S^2}$ involves only the poses. Hence, we use $C_{Z_S^1}$ in this step to initialize new SLAM features, while $C_{Z_S^2}$ will be used in the next step (see Sect. III-F) to perform updates. Specifically, from (38) and (15), initializing new SLAM features corresponds to the cost function:

$$C_k^{NS}(\tilde{x}_k) = C_k^{SR}(\tilde{x}_k^R) + C_{Z_S^1}(\tilde{x}_S^N, \tilde{x}_F) \quad (42)$$

$$= \| R_k^{SR} \tilde{x}_k^R - r_k^{SR} \|^2 + \sum_{j=1}^{N_{NS}} \| R_f^{j\,G} \tilde{p}_{f_j} + F_{1_S}^j \tilde{x}_F - \tilde{z}_{1_S}^j \|_{\sigma^2 I}^2$$

If we partition the current upper-triangular information factor, $R_k^{SR}$, and the corresponding residual vector, $r_k^{SR}$, according to the state $x_k^R$ in (40) as:

$$R_k^{SR} = \begin{bmatrix} R_{SS} & R_{SF} \\ 0 & R_{FF} \end{bmatrix}, r_k^{SR} = \begin{bmatrix} r_S \\ r_F \end{bmatrix} \quad (43)$$

then the cost function in (42), after initializing the new SLAM features, becomes $$C_k^{NS}(\tilde{x}_k) = \| R_k^{NS} \tilde{x}_k - r_k^{NS} \|^2 \quad (44)$$

$$R_k^{NS} = \begin{bmatrix} R_{SS} & 0 & R_{SF} \\ & \frac{1}{\sigma} R_f^1 & & \frac{1}{\sigma} F_{1_S}^1 \\ 0 & & \ddots & & \vdots \\ & & & \frac{1}{\sigma} R_f^{N_{NS}} & \frac{1}{\sigma} F_{1_S}^{N_{NS}} \\ 0 & 0 & R_{FF} \end{bmatrix} \quad (45)$$

$$r_k^{NS} = \begin{bmatrix} r_S \\ \frac{1}{\sigma} \tilde{z}_{1_S}^1 \\ \vdots \\ \frac{1}{\sigma} \tilde{z}_{1_S}^{N_{NS}} \\ r_F \end{bmatrix} \quad (46)$$

Note that $R_k^{NS}$ in (45) is already upper-triangular, since both $R_{SS}$ and $R_{FF}$ are upper-triangular [see (43)], and $R_f^j$, $j=1, \ldots, N_{NS}$, are upper-triangular from the Givens rotation operations in (18).

F. Update: New SLAM & MSCKF Pose Constraints

The last update step incorporates the pose-constraint information from both new-SLAM and MSCKF feature measurements. Specifically, [see (19), (44), and (16)], this step corresponds to the following changes to the cost function:

$$C_k^{\oplus}(\tilde{x}_k) = C_k^{NS}(\tilde{x}_k) + C_{Z_S^2}(\tilde{x}_F) + C_{Z_M^2}(\tilde{x}_F) \quad (47)$$

$$= \| R_k^{NS} \tilde{x}_k - r_k^{NS} \|^2 + \sum_{j=1}^{N_{NS}} \| F_{2_S}^j \tilde{x}_F - \tilde{z}_{2_S}^j \|_{\sigma^2 I}^2 +$$

$$\sum_{i=1}^{N_M} \| F_{2_M}^i \tilde{x}_F - \tilde{z}_{2_M}^i \|_{\sigma^2 I}^2$$

Note that both $C_{Z_S^2}$ and $C_{Z_M^2}$ involve only the pose state $\tilde{x}_F$, which is, by design, at the end of the state vector $\tilde{x}_k$ [see (41)]. After performing thin-QR factorization on the following stacked Jacobians corresponding to the pose part of the current factor:

$$\begin{bmatrix} R_{FF} \\ \vdots \\ \frac{1}{\sigma} F_{2_S}^j \\ \vdots \\ \frac{1}{\sigma} F_{2_M}^i \\ \vdots \end{bmatrix} = Q_{FF}^{\oplus} R_{FF}^{\oplus}, \qquad (48)$$

the cost function, in (47), becomes [see (45) and (46)]:

$$C_k^{\oplus}(\tilde{x}_k) = \|R_k^{\oplus} \tilde{x}_k - r_k^{\oplus}\|^2 \qquad (49)$$

$$R_k^{\oplus} = \begin{bmatrix} R_{SS} & 0 & R_{SF} \\ & \frac{1}{\sigma} R_f^1 & & \frac{1}{\sigma} F_{1_S}^1 \\ 0 & \ddots & & \vdots \\ & & \frac{1}{\sigma} R_f^{N_{NS}} & \frac{1}{\sigma} F_{1_S}^{N_{NS}} \\ 0 & & 0 & R_{FF}^{\oplus} \end{bmatrix} \qquad (50)$$

$$r_k^{\oplus} = \begin{bmatrix} r_S \\ \frac{1}{\sigma} \tilde{z}_{1_S}^1 \\ \vdots \\ \frac{1}{\sigma} \tilde{z}_{1_S}^{N_{NS}} \\ r_F^{\oplus} \end{bmatrix}, \quad r_F^{\oplus} = Q_{FF}^{\oplus r} \begin{bmatrix} r_F \\ \vdots \\ \frac{1}{\sigma} \tilde{z}_{2_S}^j \\ \vdots \\ \frac{1}{\sigma} \tilde{z}_{2_M}^i \\ \vdots \end{bmatrix} \qquad (51)$$

where (51) is computed in place through the QR process. i.e., without explicitly forming $Q_{FF}^{\oplus}$.

Note that this step is very efficient for two reasons:
1) We only need to stack and perform QR on the pose Jacobian part [see (48)], instead of working with the whole factor.
2) Due to the upper-triangular structure of $R_{FF}$, and the block upper-triangular structure of the Jacobians $F_{2_S}^j$, and $F_{2_M}^i$ (see Sect. II-C), a row permutation can bring the stacked matrix in (48) into a block upper-triangular form (with a large portion of zeros at the bottom left corner), which allows very efficient QR.

At this point, the information factor has been updated, into $R_k^{\oplus}$, using all the information inside the sliding window.

G. State Update

The last step in the SR-ISWF algorithm is to update the state, by minimizing (49) with respect to the error state vector:

$$\min_{\tilde{x}_k} C_k^{\oplus}(\tilde{x}_k) = \min_{x_k} \|R_k^{\oplus} \tilde{x}_k - r_k^{\oplus}\|^2 \qquad (52)$$

Since $R_k^{\oplus}$ is upper-triangular and invertible, this corresponds to solving the linear equation $$R_k^{\oplus} \tilde{x}_k = r_k^{\oplus} \qquad (53)$$

which simply requires an efficient back-substitution. Moreover, even faster solutions are achieved by noticing that the top-left portion of $R_k^{\oplus}$, corresponding to the SLAM features, is block-diagonal [see (50)].

Finally, after solving for $\tilde{x}_k$, the state update is given by $$\hat{x}_k^{\oplus} = \hat{x}_k + \tilde{x}_k \qquad (54)$$

where $\hat{x}_k$ comprises estimates for the states considered in the previous time step, $\hat{x}_{k-1}$, as well as the new pose state estimate (from propagation) and the new SLAM feature estimates (from triangulation).

At this point, both the information factor $R_k^{\oplus}$ and the state estimate $\hat{x}_k^{\oplus}$ have been updated, and will serve as the prior state estimate and prior information factor, respectively, for the next time step.[5]

EXPERIMENTAL RESULTS

An experiment was performed to validate the capability of the SR-ISWF described above for real-time operation on commercial-grade, resource-constrained devices, such as cell phones. The techniques are compared to current state-of-the-art VINS in terms of accuracy and speed on mobile devices, the technique described in Anastasios I. Mourikis and Stergios I. Roumeliotis, *A multi-state constraint kalman filter for vision-aided inertial navigation*. In Proc. of the IEEE International Conference on Robotics and Automation, pages 3482-3489, Rome, Italy, Apr. 10-14 2007 (referred to herein as "MSC-KF"), as well as an efficient single-precision implementation of the short-term smoother of Han-Pang Chiu, Stephen Williams, Frank Dellaert, Supun Samarasekera, and Rakesh Kumar, *Robust vision-aided navigation using sliding-window factor graphs*, In Proc. of the IEEE International Conference on Robotics and Automation, pages 46-53, Karlsruhe, Germany, May 6-10 2013 (referred to herein as "STS). For fair comparisons, all three techniques were evaluating using the same feature selection scheme and estimate the time synchronization, rolling shutter, and extrinsic parameters.

A Samsung S4 mobile phone was used as the testbed. The S4 was equipped with a 1.6 GHz quad-core Cortex-A15 ARM CPU, a MEMS-quality IMU running at 100 Hz, and a rolling shutter camera providing images with resolution 640×480 at 30 Hz. The camera and the IMU has separate clocks, while the image time-stamps where inaccurate.

A single-threaded pipeline consisting of feature extraction and tracking was implemented to provide visual measurements to the filter. First, the pipeline extracted 200 Harris corners from images acquired at a frequency of 15 Hz, while these features were tracked using the Kanade-Lucas-Tomasi (KLT) algorithm across images. Then, a 2-Point RANSAC was used for initial outlier rejection. The visual measurements were assumed to be contaminated by zero-mean white Gaussian noise with $\alpha=1:5$ pixels. After that, the information manager selected a maximum of 20 SLAM and 60 MSCKF features, respectively. These feature measurements were then fed to the filter, which maintains a sliding window of 10 cloned poses. These clones were selected at a frequency of approximately 5 Hz. To achieve fast operation, the whole pipeline was running in single-precision floating-point format and is optimized for the ARM NEON co-processor.

Localization Accuracy

In the experiments, several indoor datasets were collected using the S4 cell phone sensors. In all the datasets, the device was returned back to its starting position. This allowed us to quantitatively evaluate the accuracy of the estimators using the loop closure error percentage, which was computed as the ratio of the distance between the estimated starting and ending points against the total distance travelled (see Table I).

TABLE I

COMPARISON: LOOP-CLOSURE ERROR PERCENTAGES

| | Trajectory Length (m) | MSC-KF (%) | STS (%) | SR-ISWF (%) |
|---|---|---|---|---|
| Dataset 1 | 285 | 0.65 | 0.48 | 0.44 |
| Dataset 2 | 56 | 0.52 | 0.71 | 0.77 |
| Dataset 3 | 97 | 0.5 | 0.52 | 0.55 |
| Dataset 4 | 105 | 0.58 | 0.74 | 0.7 |
| Dataset 5 | 198 | 0.42 | 0.35 | 0.27 |

Figure 9:
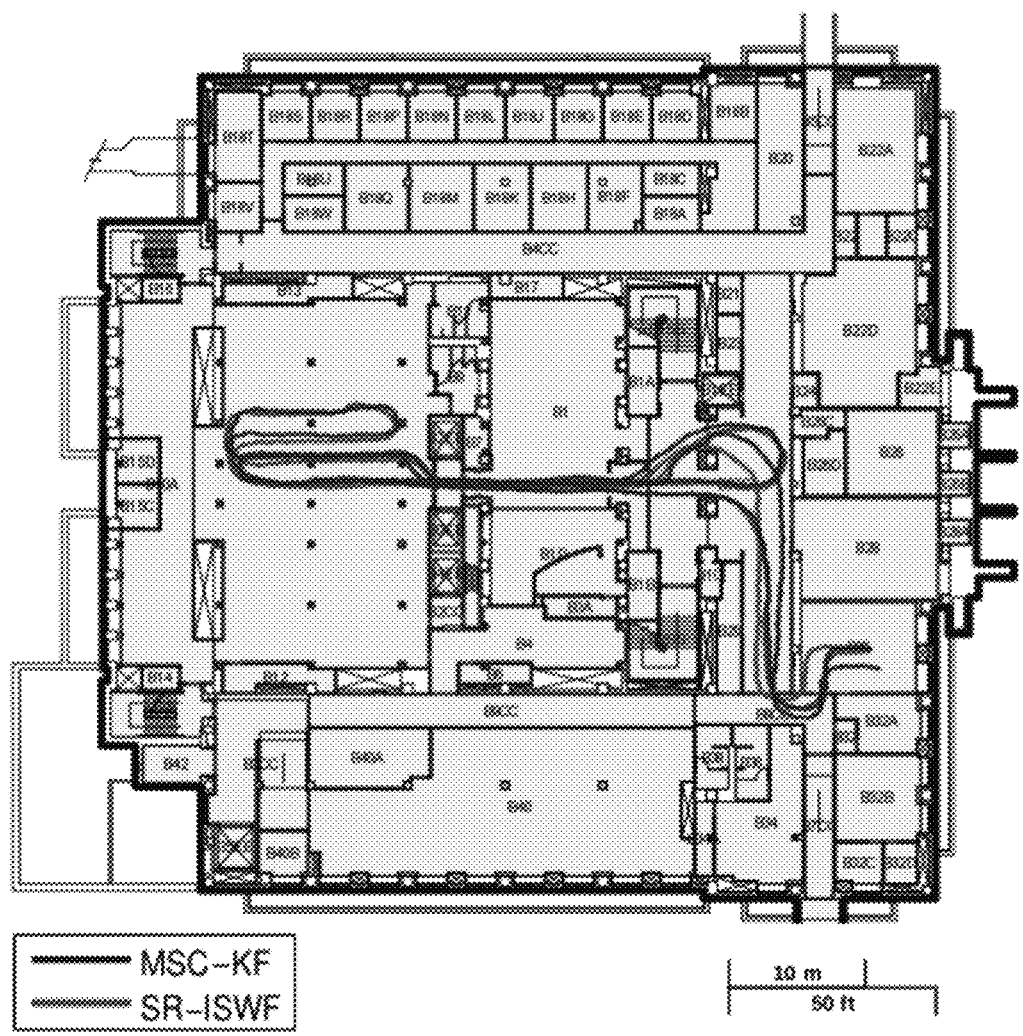
FIGS. 9-11 are diagrams illustrating overhead (x-y) views of estimated 3D trajectories for a various dataset (Dataset 1) as computed during an experiment by a square root inverse sliding-window filter (ISWF) described herein.
Figure 10:
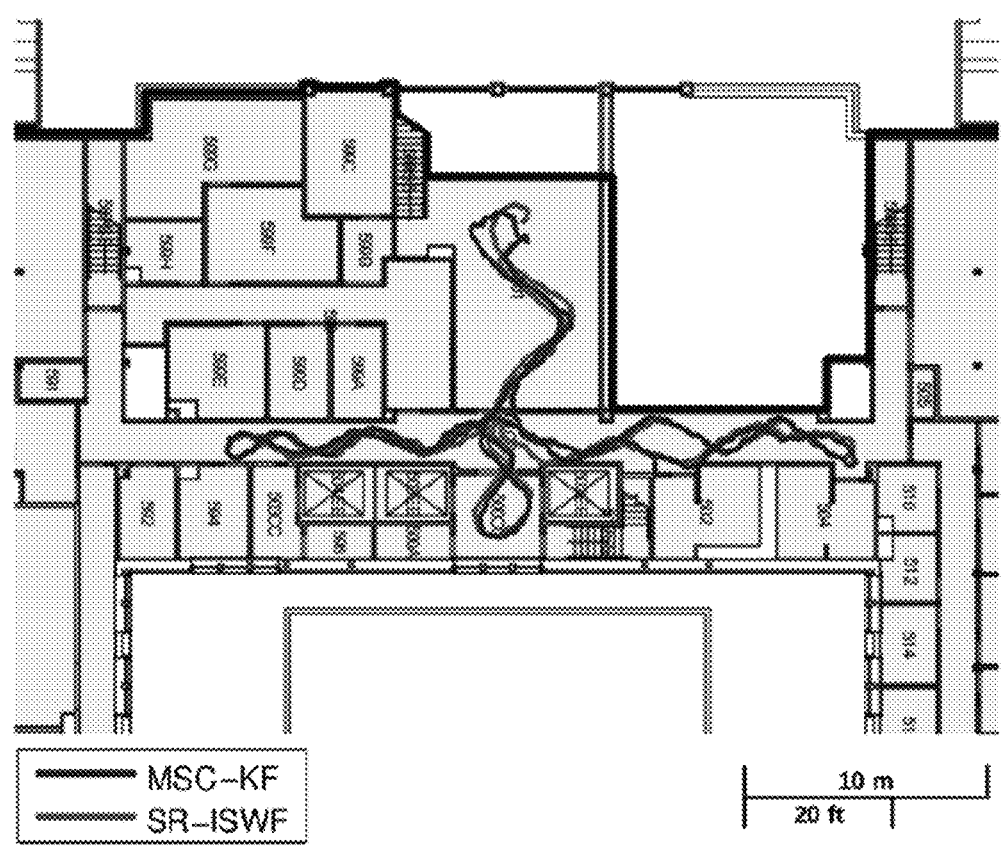
Figure 11:
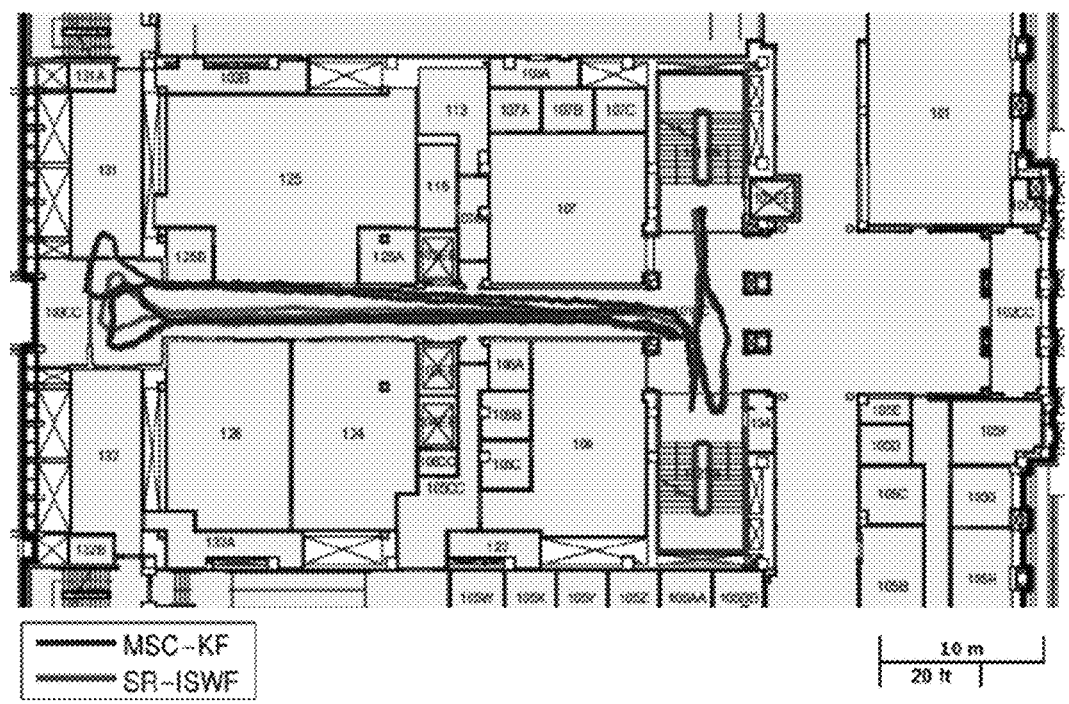

To visualize the estimation accuracy, FIGS. 8-10 overlay the trajectories onto the blueprints of the floor plans. That is, FIGS. 8-10 illustrate the trajectory estimates computed by the SR-ISWF described herein and the MSC-KF. As evident, the estimated trajectories from the SR-ISWF and the MSC-KF differ in certain parts, but in most places they overlay each other. That, as well as the results in Table I lead us to believe that all three techniques achieve comparable levels of accuracy.

Computational Efficiency

Table II compares the processing times in milliseconds (msec) of the three algorithms running on the S4 mobile phone.

TABLE II

COMPARISON: TIMING RESULTS PER FILTER UPDATE (MSEC)

| | MSC-KF | STS | SR-ISWF |
|---|---|---|---|
| Filler Update Mean/Std | 50.7/6.8 | 52.1/7.0 | 23.5/4.3 |
| Total Pipeline Mean | 114.4 | 100.2 | 71.8 |

As evident the SR-ISWF outperformed the other approaches in terms of speed (the filter update requires less than half of the time of either the MSC-KF or the STS), and achieves better than real-time operation. This significant performance gain was attributed to the efficiency of the proposed SR-ISWF algorithm, as well as the ability to operate in single precision data format thanks to the square-root formulation. Finally, the SR-ISWF was compared with the iterative Kalman smoother in Dimitrios G. Kottas and Stergios I. Roumeliotis. An iterative Kalman smoother for robust 3D localization on mobile and wearable devices. In Proc. of the IEEE International Conference on Robotics and Automation, pages 6336-6343, Seattle, Wash., May 26-30 2015 (herein "IKS"). The implementation of the IKS, however, could process MSCKF but not SLAM features. Thus, we were only able to provide qualitative comparison results: In terms of estimation accuracy, the two algorithms perform similarly under nominal conditions, yet the IKS is more robust to disturbances (e.g., abrupt changes in the time-synchronization due to changes in the lightening conditions, navigating through featureless areas, etc). In terms of speed, since the IKS employs iterative updates at each timestep, it ran slower than the MSC-KF (see Table II), thus, the IKS required significantly more time than the SR-ISWF described herein.

In the above sections, a square root inverse sliding window filter (SR-ISWF) was presented for high-precision, real-time vision-aided inertial navigation systems (VINS) on resource-constrained mobile devices. Due to the square-root formulation, the proposed estimation filter provides improved numerical properties than an inverse filter (INVF), which enables using single-precision format for performing numerical operations very fast. The SR-ISWF described herein takes advantage of the particular structure of the matrices involved to deliver significant computational gain. The SRISWF described above achieves comparable positioning accuracy with competing algorithms, while significantly outperforms them in terms of speed.

Figure 12:
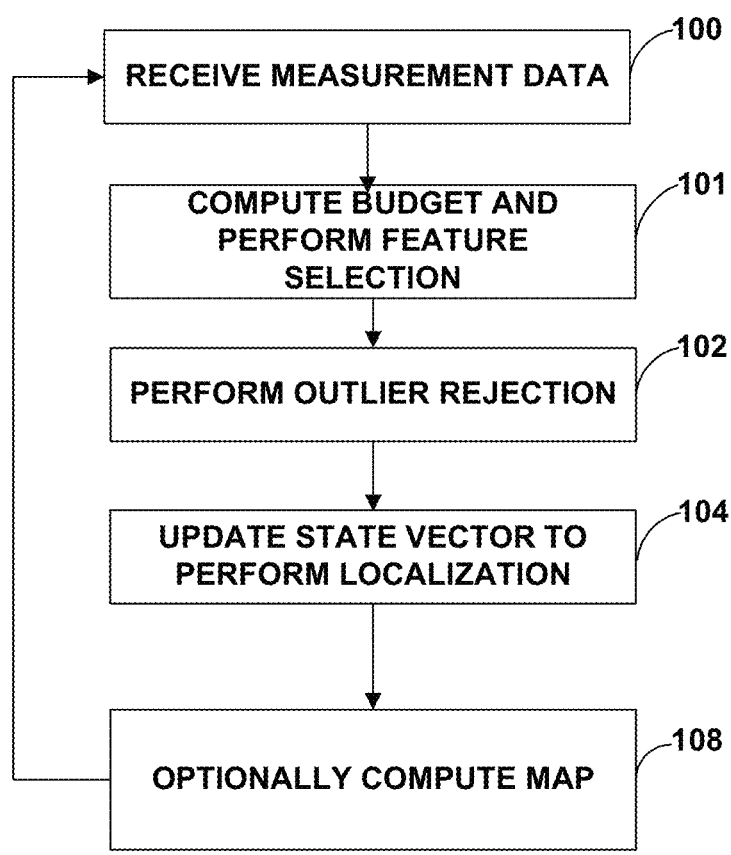
FIG. 12 is a flowchart illustrating example operation of a device in accordance with the techniques described herein.

FIG. 12 is a flowchart illustrating example operation of a device in accordance with the techniques described herein. The device may, for example, comprise a vision-aided inertial navigation system, mobile device, laptop, table, robot, vehicle, server, cloud-based processing system or other device having a processor or other operating environment for implementing the techniques described herein. For purposes of explanation, FIG. 9 will be described with respect to VINS 10 of FIGS. 1 and 3.

Initially, estimator 22 receives measurement data (100). That is, estimator 22 receives image data 14 produced by an image source(s) 12 of the vision-aided inertial navigation system 10 along a trajectory of the VINS. In addition, estimator 22 receives, from an inertial measurement unit (IMU) 16, IMU data 18 indicative of motion of VINS 10 along the trajectory. In this way, VINS 10 receives and records, within VINS data 24, image data 14 and IMU data 18 along the trajectory.

Next, information manager 15 of estimator 22 may determine a resource "budget," based on current loading on computational resources and performing feature selection (101). That is, based on the current processing budget, estimator 22 may select which subset of all the available feature measurements to process as SLAM features or as MSCKF features, which are excluded from the state vector, in order to balance optimal localization accuracy with computing power. The SLAM features are used for SLAM-based state estimation, while the MSCKF features are used to further constrain the poses in the sliding window, as described herein.

Based on the selected features and their classification, outlier rejection module 13 provides robust outlier rejection of measurements from image source 12 and IMU 16 (102). As described herein, upon receiving additional image data or IMU data, filter 23 of estimator 22 computes a covariance from only a subset of an inverse of the Hessian matrix that was computed during a prior state update, where the covariance represents an amount of uncertainty in the state estimates within the state vector. Outlier rejection module 13 applies the covariance to reject any outliers in the additional image data or IMU data prior to estimator 22 performing an update to the state estimates within the state vector.

Estimator 22 of estimator 22 processes the current measurements for the selected features based on their classification to update predicted state estimates within the state vector for each pose of the VINS and each SLAM feature (104). At this time, filter 23 includes within the computation the constraints on the poses based on the features selected as MSCKF features. Moreover, as described herein, estimator 22 performs this process by, for each iterative update to the state vector, applying filter 23 as an inverse, sliding window filter that computes a Hessian matrix and residual vector based on current information. As described herein, estimator 22 and filter 23 efficiently leverage the Hessian matrix or portions thereof for the current update as well as the subsequent update.

Based on the computed state estimates, estimator 22 may construct a map, e.g., a 2D or 3D map, of the environment (108). The map may, for example, include position and orientation information for the VINS along the trajectory relative to position information for any features observed by the VINS. The map may be displayed, stored, used for subsequent navigation and the like.

Figure 13:
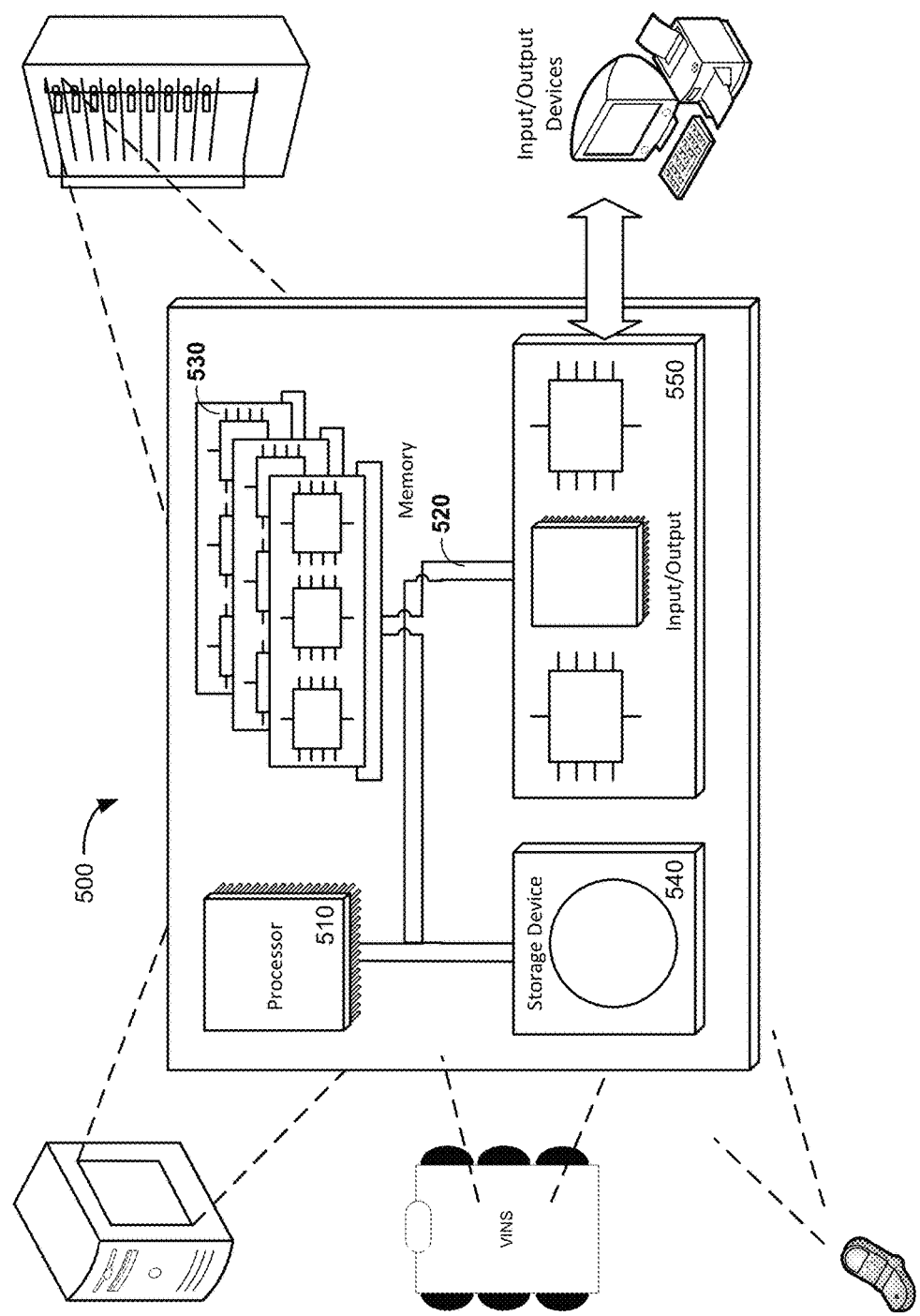
FIG. 13 shows a detailed example of various devices that may be configured to implement various embodiments in accordance with the current disclosure.

FIG. 13 shows a detailed example of various devices that may be configured to implement some embodiments in accordance with the current disclosure. For example, device 500 may be a robot, mobile sensing platform, a mobile phone, a workstation, a computing center, a cluster of servers or other example embodiments of a computing environment, centrally located or distributed, capable of executing the techniques described herein. Any or all of the devices may, for example, implement portions of the techniques described herein for a vision-aided inertial navigation system. In this example, a computer 500 includes a hardware-based processor 510 that may be incorporated into VINS 10 or any device to execute program instructions or software, causing the computer to perform various methods or tasks, such as performing the techniques described herein.

Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments of the invention have been described. These and other embodiments are within the scope of the following claims.

The invention claimed is:

1. A vision-aided inertial navigation system comprising:
at least one image source to produce image data along a trajectory of the vision-aided inertial navigation system (VINS) within an environment, wherein the image data contains a plurality of features observed within the environment at a plurality of poses of the VINS along the trajectory;
an inertial measurement unit (IMU) to produce IMU data indicative of motion of the vision-aided inertial navigation system; and
a hardware-based processing unit comprising an estimator that determines, based on the image data and the IMU data, estimates for at least a position and orientation of the vision-aided inertial navigation system for a plurality of poses of the VINS along the trajectory,
wherein the estimator determines the estimates by:
classifying, for each of the poses, each of the features observed at the respective pose into either a first set of the features or a second set of the features,
maintaining a state vector having states for a position and orientation of the VINS and for positions with the environment for the first set of features for a sliding window of two or more of the most recent poses along the trajectory without maintaining states for positions of the second set of features within the state vector, and applying an inverse sliding window filter to compute constraints between the poses within the sliding window based on the second set of features and compute, in accordance with the constraints, the state estimates within the state vector for the sliding window.

2. The vision-aided inertial navigation system of claim 1, wherein the estimator applies the inverse sliding window filter by, for each update of the state estimates within the state vector, computing a Hessian matrix that excludes at least a portion of the second features set, wherein the Hessian matrix represents a subset of the IMU data and the image along the trajectory, and wherein the estimator updates the state estimates based on the Hessian.

3. The vision-aided inertial navigation system of claim 2, further comprising an outlier rejection module, wherein, upon receiving additional image data or IMU data, the filter computes a covariance from only a subset of an inverse of the Hessian matrix, wherein the covariance represents the amount of uncertainty in the state estimates, and wherein the outlier rejection module applies the covariance to reject any outliers in the additional image data or IMU data prior to performing an update to the state estimates within the state vector.

4. The vision-aided inertial navigation system of claim 2, wherein the outlier rejection module applies apply a 2-Point Random sample consensus (RANSAC) technique.

5. The vision-aided inertial navigation system of claim 2, wherein the estimator applies the inverse sliding window filter by, for each update of the state estimates:

computing, as a covariance, only a subset of the inverse of the Hessian matrix, wherein the covariance represents the amount of uncertainty in the state estimates;

identifying information sources within the estimator based on the covariance, wherein the information sources comprise VINS poses and features; and marginalizing, based on the identified information sources, a portion of the states to keep a constant-sized state vector comprising the identified VINS poses and features.

6. The vision-aided inertial navigation system of claim 2, wherein the inverse sliding window filter comprises a square root inverse sliding window filter in which the estimator computes the Hessian matrix as a square root factor of a Hessian matrix that excludes the second features set.

7. The vision-aided inertial navigation system of claim 2, wherein the estimator classifies the features of the first set of as simultaneous localization and mapping (SLAM) features for computing the state estimates and the second set of features as Multi-state Constraint Kalman Filter (MSCKF) features for computing the constraints.

8. The vision-aided inertial navigation system of claim 5, wherein the estimator maintains the state vector to have a threshold number of SLAM features and to exclude all of the MSCKF features, where the estimator sets threshold based on current resource utilization within the VINS.

9. The vision-aided inertial navigation system of claim 5, wherein the estimator uses a modified measurement model for the MSCKF feature measurements that marginalizes the MSCKF features without maintaining state estimates for the MSCKF features in the state vector.

10. The vision-aided inertial navigation system of claim 5, wherein the Hessian matrix stores terms computed from previous marginalization of the SLAM features for prior poses no longer within the sliding window.

11. The vision-aided inertial navigation system of claim 5, wherein blocks of the Hessian matrix corresponding to the VINS poses $x_R$ and the SLAM feature states l are fully dense due to previous marginalization, while the blocks involving MSCKF feature states f have at least some sparse structures.

12. The vision-aided inertial navigation system of claim 1, wherein the estimator:

computes a budget specifying an amount of resources that can be allocated to state estimations for a current pose of the VINS;

selects, based on the budget, the first set of features and the second set of features as subsets of all available features; and computes the state estimate in accordance with the selected features.

13. The vision-aided inertial navigation system of claim 1, wherein the states within the state vector represent, for each of the poses within the sliding window, an orientation and position of the VINS at a corresponding location along the trajectory.

14. The vision-aided inertial navigation system of claim 1, wherein the vision-aided inertial navigation system is integrated within a tablet computer, a laptop computer, a mobile phone, a robot or a vehicle.

15. A method comprises:

producing image data along a trajectory of the vision-aided inertial navigation system (VINS) within an environment, wherein the image data contains a plurality of features observed within the environment at a plurality of poses of the VINS along the trajectory;

producing inertial measurement data from an inertial measurement unit (IMU) indicative of motion of the vision-aided inertial navigation system; and determining estimates for a position and orientation of the vision-aided inertial navigation system for a plurality of poses of the VINS along the trajectory, based on the image data and the IMU data, with a processing unit comprising an estimator, wherein computing the state estimates comprises:

classifying, for each of the poses, each of the features observed at the respective pose into either a first set of the features or a second set of the features, maintaining a state vector having states for the position and orientation of the VINS and for positions with the environment for the first set of features for a sliding window of two or more of the most recent poses along the trajectory without maintaining states for positions of the second set of features, and applying an inverse sliding window filter to compute constraints between the poses within the sliding window based on the second set of features and compute, in accordance with the constraints, the state estimates within the state vector for the sliding window.

16. The method of claim 15, wherein applying an inverse sliding window filter comprises:

computing a Hessian matrix that excludes the second features set, wherein the Hessian matrix represents a subset of the IMU data and the image along the trajectory based on a budget computed by the VINS; and computing the state estimates based on the Hessian.

17. The method of claim 16, further comprising:
responsive to receiving additional image data or IMU data, computing a covariance from only a subset of an inverse of the Hessian matrix of the inverse sliding window filter, wherein the covariance represents the amount of uncertainty in the state estimates within the state vector, and utilizing the covariance within an outlier rejection process to reject any outliers in the additional image data or IMU data prior to performing an update to the state estimates within the state vector.

18. The method of claim 16, wherein applying an inverse sliding window filter comprises:
computing, as a covariance, only a subset of the inverse of the Hessian matrix, wherein the covariance represents the amount of uncertainty in the state estimates; and identifying information sources within the estimator based on the covariance, wherein the information sources comprise VINS poses and features; and marginalizing, based on the identified information sources, a portion of the states to keep a constant-sized state vector comprising the identified VINS poses and features.

19. The method of claim 16, wherein the applying an inverse sliding window filter comprises applying a square root inverse sliding window filter (SQRT-ISWF) in which the Hessian matrix is computed as a square root factor of a Hessian matrix that excludes the second features set.

20. The method of claim 16, further comprising classifying the features of the first set of as simultaneous localization and mapping (SLAM) features for computing the state estimates and the second set of features as Multi-state Constraint Kalman Filter (MSCKF) for computing the constraints.

21. The method in claim 20, further comprising maintaining the state vector to have a threshold number of SLAM features, where the estimator sets threshold based on current resource utilization within the VINS.

22. The method in claim 20, further comprising using a modified measurement model for the MSCKF feature measurements that marginalizes the MSCKF features without maintaining state estimates for the MSCKF features in the state vector.

23. The method in claim 20, wherein the Hessian matrix stores terms computed from previous marginalization of the SLAM features for prior poses no longer within the sliding window.

24. The method in claim 20, wherein blocks of the Hessian matrix correspond to poses $x_R$ and the SLAM feature states l are fully dense due to previous marginalization, while the blocks involving MSCKF feature states f have some sparse structures.

25. The method in claim 15, further comprising:
computing a budget specifying an amount of resources that can be allocated to state estimations for a current pose of the VINS, selecting the first set of features and the second set of features from a subset of all available features determined based on the budget, and computing the state estimate in accordance with the selected features.

26. The method in claim 15, wherein the states within the state vector representing, for each of the poses within the sliding window, an orientation and position.

27. The method of claim 15, wherein the sliding window comprises a square root inverse sliding window filter (SQRT-ISWF).

* * * * *